(12) United States Patent
Ishihara

(10) Patent No.: US 9,815,392 B2
(45) Date of Patent: Nov. 14, 2017

(54) HEADREST

(71) Applicant: TS TECH CO., LTD., Asaka-shi, Saitama (JP)

(72) Inventor: Kazunori Ishihara, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 204 days.

(21) Appl. No.: 14/758,282

(22) PCT Filed: Dec. 28, 2012

(86) PCT No.: PCT/JP2012/084168
§ 371 (c)(1),
(2) Date: Jun. 29, 2015

(87) PCT Pub. No.: WO2014/103044
PCT Pub. Date: Jul. 3, 2014

(65) Prior Publication Data
US 2015/0329023 A1    Nov. 19, 2015

(51) Int. Cl.
*B60N 2/48* (2006.01)

(52) U.S. Cl.
CPC ......... *B60N 2/4864* (2013.01); *B60N 2/4861* (2013.01)

(58) Field of Classification Search
CPC ....... A47C 7/38; B60N 2/4864; B60N 2/4861
USPC ........................................ 297/391
See application file for complete search history.

(56) References Cited

U.S. PATENT DOCUMENTS

| | | | |
|---|---|---|---|
| 5,020,855 A * | 6/1991 | Lindberg ............. | B60N 2/4808 297/284.1 |
| 2003/0057758 A1 | 3/2003 | Baumann et al. | |
| 2004/0262974 A1 | 12/2004 | Terada et al. | |
| 2005/0280304 A1 | 12/2005 | Akaike et al. | |
| 2006/0250001 A1* | 11/2006 | Becker ................ | B60N 2/4885 297/216.12 |
| 2007/0075578 A1 | 4/2007 | Klukowski | |

(Continued)

FOREIGN PATENT DOCUMENTS

| | | |
|---|---|---|
| CN | 1576110 A | 2/2005 |
| FR | 2 796 822 A1 | 2/2001 |
| JP | 2005-013604 A | 1/2005 |

(Continued)

OTHER PUBLICATIONS

Jul. 19, 2016 Extended Search Report issued in European Patent Application No. 12891162.5.

(Continued)

*Primary Examiner* — Milton Nelson, Jr.
(74) *Attorney, Agent, or Firm* — Oliff PLC

(57) ABSTRACT

A headrest is provided that can have increased comfort and safety. The headrest can include: an affixed-side member provided to a headrest pillar; a mobile-side member that is joined to the affixed-side member with a mobile mechanism therebetween and that can move in the front-back direction with respect to the affixed-side member; and a front-back locking mechanism that has an engaged section and a lock member that engages the engaged section, and that locks and unlocks the movement of the mobile-side member in the front-back direction. Also, the mobile-side member has a front-side cover for supporting a head. Furthermore, the engaged section is attached to the back surface of the front-side cover.

9 Claims, 14 Drawing Sheets

(56) References Cited

U.S. PATENT DOCUMENTS

2007/0241593 A1  10/2007  Woerner
2010/0026061 A1*  2/2010  McFalls ............... B60N 2/4885
                                                    297/216.12

FOREIGN PATENT DOCUMENTS

| | | |
|---|---|---|
| JP | 2005-087650 A | 4/2005 |
| JP | 2006-027593 A | 2/2006 |
| JP | 2008-035999 A | 2/2008 |
| JP | 4280589 B2 | 6/2009 |
| JP | 2012-136082 A | 7/2012 |
| JP | 2012-162123 A | 8/2012 |
| WO | 2008/099044 A1 | 8/2008 |
| WO | 2011/032702 A1 | 3/2011 |
| WO | 2012/015203 A2 | 2/2012 |

OTHER PUBLICATIONS

Apr. 2, 2013 International Search Report issued in International Application No. PCT/JP2012/084168.
Jul. 1, 2016 Office Action issued in Chinese Patent Application No. 201280078022.9.
Jun. 30, 2015 International Preliminary Report on Patentability issued in International Application No. PCT/JP2012/084168.
Feb. 13, 2017 Office Action issued in Chinese Patent Application No. 201280078022.9.

\* cited by examiner

HEADREST

TECHNICAL FIELD

The present invention relates to a headrest.

BACKGROUND ART

A headrest of a vehicle seat is provided to improve the level of comfort and safety through the support of a head of a person who sits on the seat.

Patent Literature 1 discloses a headrest including a rear unit fixed to headrest pillars, and a front unit that is connected to the rear unit with a pair of X link members of a linkage and moves apart from the rear unit upon a rear-end collision. The movement of the front unit of the headrest apart from the rear section is caused by an unlocking operation of a solenoid in response to the rear-end collision.

Such a headrest, which includes the X link members functioning as diagonal supports, has sufficient strength against the stress of a head pushing back the front unit of the headrest.

CITATION LIST

Patent Literature

Patent Literature 1: Japanese Patent No. 4280589

SUMMARY OF INVENTION

Technical Problem

The level of comfort and safety offered by the headrest of the seat depends greatly on whether the headrest is at an appropriate position with respect to the head of the person who sits on the seat.

The headrest described in Patent Literature 1 has the front unit which moves only upon the rear-end collision. The position of the front unit (hereafter referred to as a movable-side member) of the headrest cannot be adjusted in the front and back directions under normal conditions. The comfort and the safety offered by the headrest have been desired to be compatible.

An object of the present invention is to provide a headrest which can enhance the comfort and the safety.

Solution to Problems

In order to solve the above problems, various embodiments of a headrest includes an affixed-side member which is arranged at a headrest pillar; a movable-side member which is connected to the affixed-side member via a moving mechanism and which moves in front and back directions with respect to the affixed-side member; and a front-back locking mechanism including a to-be-engaged unit and a lock member which engages with the to-be-engaged unit, the front-back locking mechanism locking and unlocking movement of the movable-side member in the front and back directions, wherein the movable-side member includes a front cover which supports a head, and the to-be-engaged unit is attached on a back surface of the front cover.

In various embodiments of the headset, a plurality of the to-be-engaged units are provided, and the plurality of the to-be-engaged units are arranged at position so that the moving mechanism is to be arranged therebetween.

In various embodiments of the headrest, the moving mechanism is formed in a linkage mechanism, the front cover includes supporting units which rotatably support link members which constitute the linkage mechanism, and connecting members, which rotatably connect end parts of the link members to the supporting units, are provided so as to penetrate the to-be-engaged unit, the link members and the supporting units.

In various embodiments of the headrest, the linkage mechanism is a X linkage mechanism including a first link member and a second link member which are ratably connected via a center cross connection unit, and the supporting units of the front cover are arranged on both sides of the front cover in up and down directions, a front end of the first link member and a front end of the second link member are rotatably supported by the upper and lower supporting units, and the connecting members are provided so as to respectively penetrate the supporting units.

In various embodiments of the headrest, through holes in which the connecting members go through are respectively formed at the upper and lower supporting units, one of the through holes of the upper and lower supporting units is an elongated hole which is elongated in the up and down directions, the to-be-engaged unit includes: a plurality of teeth which are arranged in front and back directions; and upper and lower attaching units which are attached to the front cover, through holes in which the connecting members go through being formed in the upper and lower attaching units, one of the through holes of the upper and lower attachment units is an elongated hole which is elongated in the up and down directions, and the one of the through holes of the attaching units and a tooth at very front among the plurality of teeth align in a vertical direction.

In various embodiments of the headrest, the link members include a plurality of reinforcement units arranged at a plurality of parts of the link members, and at least one of the plurality of reinforcement units is formed in a honeycomb structure.

In various embodiments of the headrest, the front cover includes a reinforcement rib which is arranged on a back surface of the front cover, and the reinforcement rib and the front end parts of the link members are arranged on left and right sides of each other.

In various embodiments of the headrest, the headrest pillar includes a pair of pillars, the affixed-side member includes: a pair of pillar holding units which are arranged on both side end parts of the affixed-side member and which respectively hold the pillars of the headrest pillar forming the pair; and a connector which connects between the upper ends of the pillar holding units forming the pair.

In various embodiments of the headrest, a part of the affixed-side member which is surrounded by the pillar holding units forming the pair and the connector is a concave unit, and when the affixed-side member and the movable-side member are close to each other, the moving mechanism is to be housed in the concave unit.

In various embodiments of the headrest, the to-be-engaged unit is projected toward the affixed-side member from the back surface of the front cover, a through hole is formed in the affixed-side member at a position corresponding to the to-be-engaged unit, the to-be-engaged unit being inserted in the through hole, and a wall which faces the to-be-engaged unit is provided at a circumference of the through hole.

Advantageous Effects of Invention

According to various embodiments of the invention, the front-back positional adjustment of the movable-side member using the to-be-engaged units and supporting of the heat by the to-be-engaged units at the time collision are compatible. Therefore, the level of comfort and security of the seat when a passenger sits thereon can be improved.

According to various embodiments of the invention, since the plurality of the to-be-engaged units are arranged at a plurality of parts having the moving mechanism therebetween, operation of the moving mechanism and the front-back locking mechanism can be carried out in a good balance. Further, since the head can be supported by the plurality of the to-be-engaged units, the level of security can be improved.

According to various embodiments of the invention, since the connecting members are used to connect the to-be-engages units, the link members and the supporting units and used as rotary shafts, the number of parts needed can be reduced due to sharing the parts.

According to various embodiments of the invention, even if the parts to be connected increase, they can be connected by the connecting members. Therefore, the effect of reduction in the number of parts due to sharing can be improved even more.

According to various embodiments of the invention, the length in the up and down directions of the part near the upper end of the elongated hole of one of the attachment units can be made longer for the part corresponding to the very front teeth. Therefore, rigidity of one of the attachment units can be improved.

According to various embodiments of the invention, by forming at least one of the plurality of reinforcement units of the link member in the honeycomb structure, the link member can be lightened and reinforced so as not to bend easily.

According to various embodiments of the invention, interference between the reinforcement rib of the front cover and the front end part of the link member can be prevented, and rigidity of the front cover can be improved by the reinforcement rib.

According to various embodiments of the invention, the upper end parts of the pair of pillar holding units can be connected by the connector. Therefore, the connecting condition of the pillar holding units forming the pair can be improved and rigidity of the affixed-side member can be improved.

According to various embodiments of the invention, since the moving mechanism can be housed in the concave unit, the space between the affixed-side member and the movable-side member can be used efficiently, and the headrest can be formed in a compact manner.

According to various embodiments of the invention, the projecting tips of the to-be-engaged units which are inserted in the through holes are held by the affixed-side member in which the through holes are formed. Further, since the to-be-engaged units can be supported by the walls which face the to-be-engaged units, stability of the movable-side member at the time of front-back positional adjustment can be improved.

DESCRIPTION OF EMBODIMENTS

Figure 1:
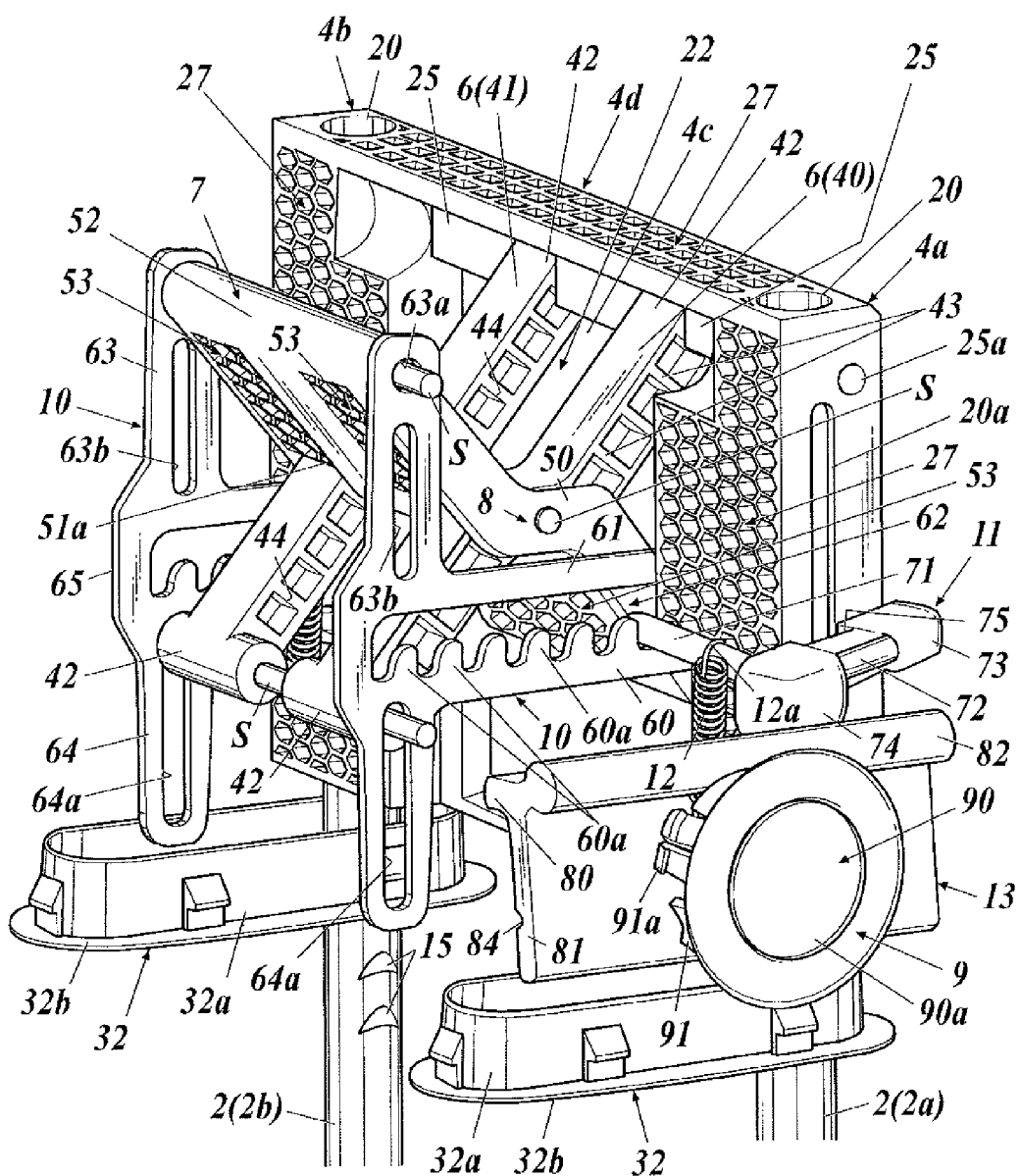
FIG. 1 is a perspective view showing an inner mechanism of a headrest.
Figure 2:
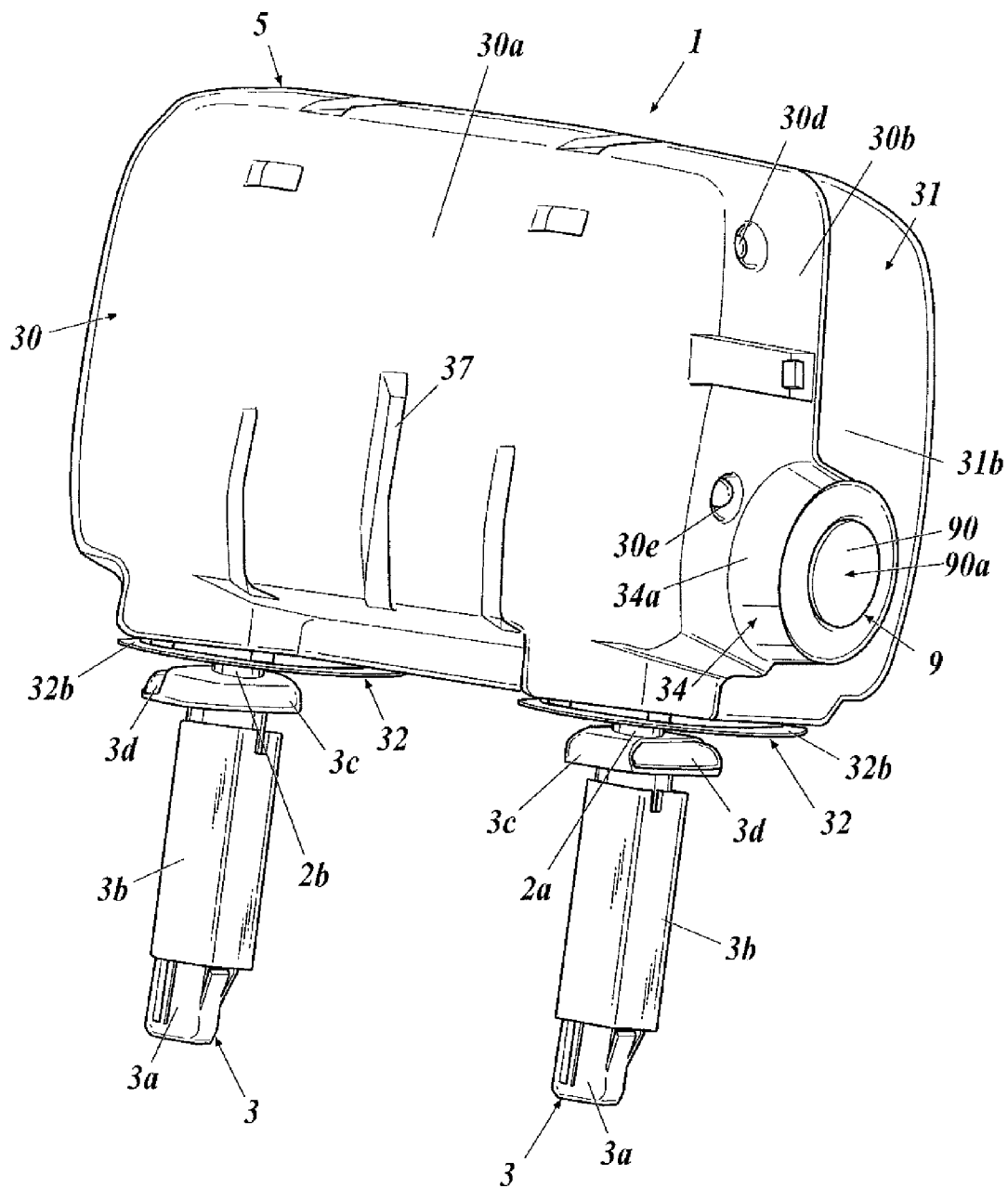
FIG. 2 is a perspective view showing a headrest in a state where a front cover and a back cover are attached.

Hereinafter, an embodiment of the present invention will be described with reference to the drawings.

As shown in FIGS. 1 to 11, a headrest 1 of the embodiment includes a headrest pillar 2 having a pair of pillars 2a and 2b, a pair of holder units 3 and 3, an affixed-side member 4, a moveable-side unit 5, a moving mechanism, a front-back locking mechanism, an up-down locking mechanism and an operation unit 9. The headrest 1 further includes a cushion pad and an outer layer material which are arranged around the headrest 1.

The headrest 1 is attached to the upper end part of a seatback of a vehicle seat.

Here, in the embodiment, the front, back, up, down, left and right directions comply with the direction of the vehicle seat and the vehicle.

The pair of holders 3 and 3 are to be attached to a seatback frame which is the framework of the seatback.

The pair of pillars 2a and 2b of the headrest pillar 2 extend downward from the headrest 1 and are held by the pair of holder units 3 and 3. That is, the headrest 1 is attached to the seatback frame via the pair of pillars 2a and 2b and the pair of holder units 3 and 3.

The pillars 2a and 2b forming a pair have the same diameter, and at least one of the pillars 2a and 2b forming a pair has a plurality of cutouts 15 along the length direction with spaces therebetween.

The pillars 2a and 2b forming a pair are respectively held by the holder units 3 and 3 forming a pair. The pillars 2a and 2b are movable in the up and down directions along the holder units 3 and 3 forming a pair.

Each of the holder units 3 and 3 forming a pair includes a cylindrical main body 3a which holds either of the pillars 2a and 2b forming a pair, a cover body 3b which covers the cylindrical main body 3a and a head unit 3c which is provided at the upper end part of the cylindrical main body 3a.

Further, each head unit 3c includes a lock unit 3d which prevents either of the pillars 2a and 2b forming a pair from slipping out by engaging with the plurality of cutouts 15 of either of the pillars 2a and 2b forming a pair.

The pillars 2a and 2b forming a pair include projecting units 2c and 2c which slide freely along slits 20a and 20b of the after-mentioned affixed-side member 4 in a state where the pillars 2a and 2b forming a pair respectively being inserted in the pillar inserting holes 20 and 20 of the after-mentioned affixed-side member 4. The projecting units 2c and 2c function as so-called rotation stoppers which prevent the pillars 2a and 2b forming a pair from rotating in the circumferential direction.

The projecting units 2c and 2c project more outward than the side surfaces of the affixed-side member 4.

With respect to the affixed-side member 4, the pillars 2a and 2b forming a pair are respectively arranged at the left and right end parts thereof. The affixed-side member 4 is to be attached to the seatback frame via the pair of pillars 2a and 2b.

The affixed-side member 4 is movable in the up and down directions along the pair of pillars 2a and 2b.

The movable-side member 5 is movable in the front and back directions with respect to the affixed-side member 4 and is connected with the affixed-side member 4 via the moving mechanism. In particular, the moveable-side member 5 is connected with the affixed-side member 4 via the moving mechanism and is movable in the front direction, which is the direction parting from the affixed-side member 4, and in the back direction, which is the direction returning toward the affixed-side member 4.

The moveable-side member 5 includes a front cover 30 and a back cover 31 which can house individual parts including the affixed-side member 4, the moving mechanism, the upper parts of the pillars 2a and 2b forming a pair, etc.

The moving mechanism connects the affixed-side member 4 and the moveable-side member 5, and for example, a link mechanism is adopted. In the embodiment, in particular, an X linkage mechanism is adopted. The X linkage mechanism includes a first link member 6 (hereinafter, an inner-side link member 6) and a second link member 7 (hereinafter, an outer-side link member 7) which are connected to each other so as to rotate via a center cross connection unit 8.

The front-back locking mechanism locks and unlocks the movement of the moveable-side member 5 in the front and back directions with respect to the affixed-side member 4. The front-back locking mechanism includes to-be-engaged units 10, a locking member 11 which engages with the to-be-engaged units 10, biasing units 12 which bias the locking member 11 toward the to-be-engaged units 10 and a rotary operation member 13 which is held by the moveable-side member 5 so as to rotate freely and which operates the locking member 11.

The up-down locking mechanism locks and unlocks the affixed-side member 4 with respect to the pair of pillars 2a and 2b at any of the plurality of positions in the up and down directions. The up-down locking mechanism includes the after-mentioned up-down locking member 14.

The operation unit 9 is exposed from the outer surface of the headrest 1 and is for operating the front-back locking mechanism and the up-down locking mechanism at the same time. In particular, via the rotary operation member 13, operations to unlock the locked state of the moveable-side member 5 wherein the moveable-side member 5 is prevented from moving in the front and back directions and operation to unlock the locked state of the affixed-side member 4 wherein the affixed-side member 4 is prevented from moving in the up and down directions are carried out.

The operating direction of the operation unit 9 is along the width direction in the right and left directions. Operation of the operation unit 9 itself is carried out manually or automatically. In the embodiment, an embodiment of manual operation is adopted.

The operation unit 9 of the embodiment is a button 9 which is pushed inside the headrest 1 to operate the front-back locking mechanism and the up-down locking mechanism.

Next, the affixed-side member 4, the moveable-side member 5 and the X linkage mechanism will be described in detail.

(Affixed-Side Member)

Figure 6:
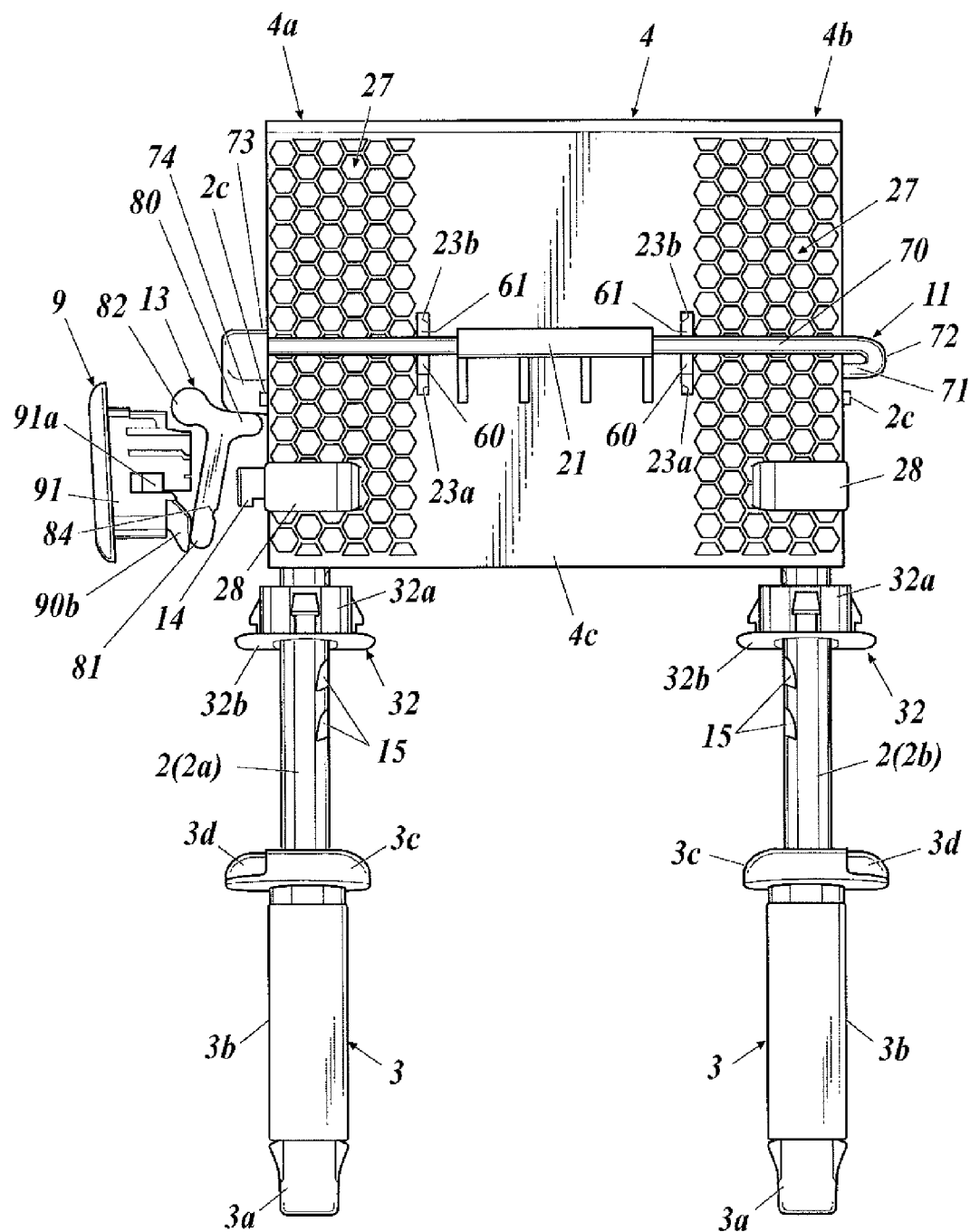
FIG. 6 is a back view showing the inner structure and an operation unit of the headrest.

The affixed-side member 4 is made of resin. As shown in FIGS. 1 and 6, for example, the affixed-side member 4 is formed in a block shape and includes a pair of pillar holding units 4a and 4b, aback side connector 4c, a connector 4d, a plurality of supporting units 25 and 26, a plurality of reinforcement units 27 . . . and a lock holding unit 28. With respect to the affixed-side member 4, all parts are formed integrally.

The pillar holding units 4a and 4b forming a pair are arranged at the right and left end parts of the affixed-side member 4, the pillar holding units 4a and 4b constituting the right and left sides of the affixed-side member 4. The pillar holding units 4a and 4b forming a pair respectively hold the pillars 2a and 2b forming a pair. By having such configuration, the affixed-side member 4 is movable in the up and down directions along the pair of pillars 2a and 2b.

The pillar holding units 4a and 4b forming a pair respectively have pillar insertion holes 20 and 20 which bore through the pillar holding units 4a and 4b forming a pair in their length direction (up and down directions), and the pillars 2a and 2b forming a pair are to be inserted therein.

On both sides of the affixed-side member 4, that is, on side surfaces of the pillar holding units 4a and 4b forming a pair, slits 20a and 20a which communicate with the pillar insertion holes 20 and 20 are respectively formed along the up and down directions.

The projecting units 2c and 2c of the pillars 2a and 2b forming a pair are to be arranged in the slits 20a and 20a, respectively.

The back side connector 4c is arranged between the pillar holding units 4a and 4b forming a pair and is a board-like member which connects the pillar holding units 4a and 4b forming a pair. The back surface of the back side connector 4c is flush with the back surfaces of the pillar holding units 4a and 4b forming a pair.

On the back surface of the back side connector 4c, a holding unit 21 which holds a to-be-held unit 70 of the after-mentioned lock member 11 is arranged. The holding unit 21 has an upward hook-like shape when seen from a side and is formed in an elongated shape along the right and left directions of the back side connector 4c.

The connector 4d is arranged between the upper end parts of the pillar holding units 4a and 4b forming a pair and is formed in a board-like body that connects between the upper end parts of the pillar holding units 4a and 4b forming a pair. The upper surface of the connector 4d is flush with the upper surfaces of the pillar holding units 4a and 4b forming a pair.

The part of the affixed-side member 4 where surrounded by the pair of pillar holding units 4a and 4b and the connector 4d is a concave unit 22 which is formed in a concave shape. In particular, the concave unit 22 is the space between the surfaces of the pillar holding units 4a and 4b forming a pair that face each other, front side of the back side connector 4c and under the connector 4d.

Figure 3:
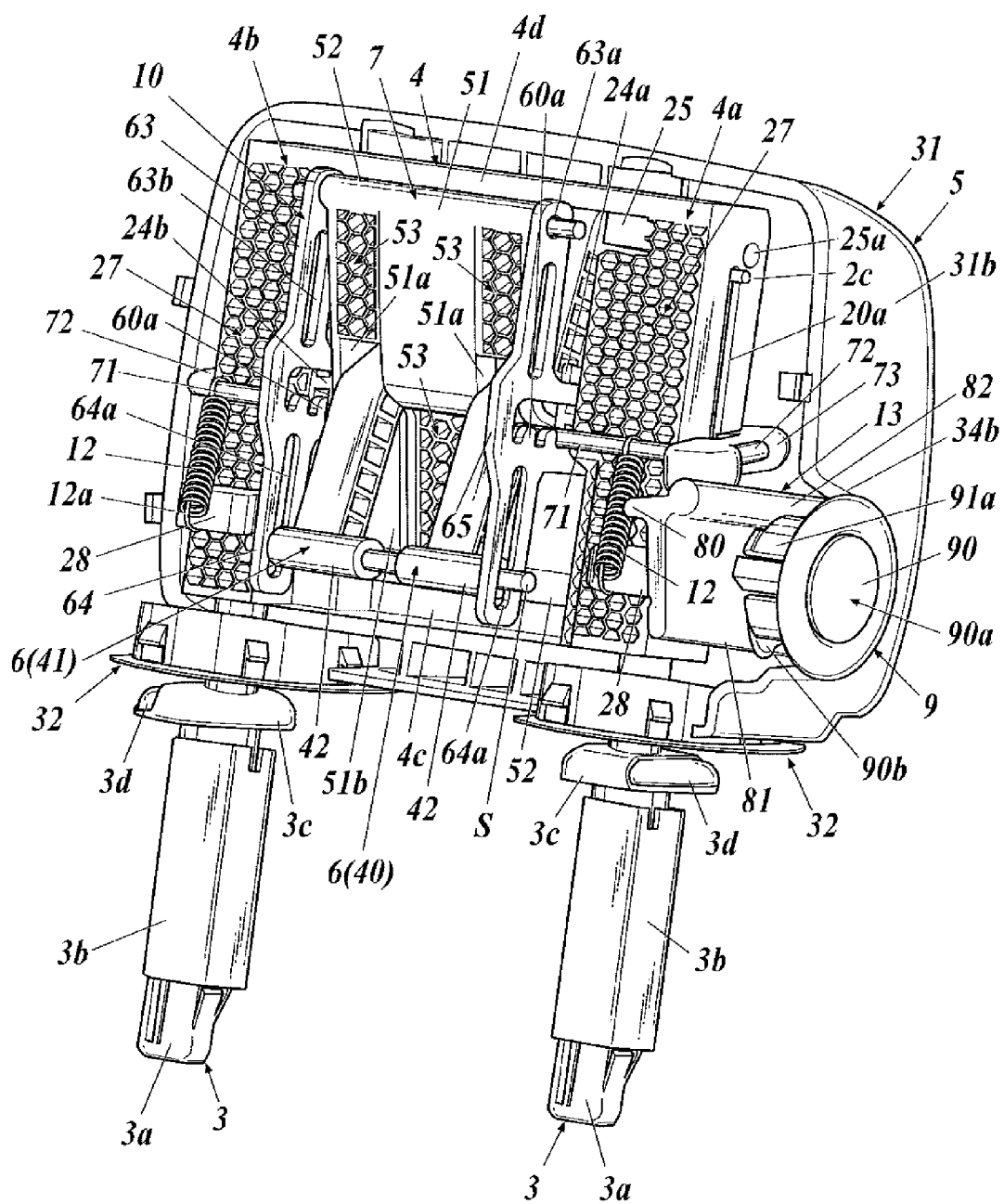
FIG. 3 is a perspective view showing a headrest in a state where the back cover is attached.

As shown in FIG. 3, the moving mechanism is to be housed in the concave unit 22 in a state where the affixed-side member 4 and the movable-side member 5 are close to each other.

Figure 8:
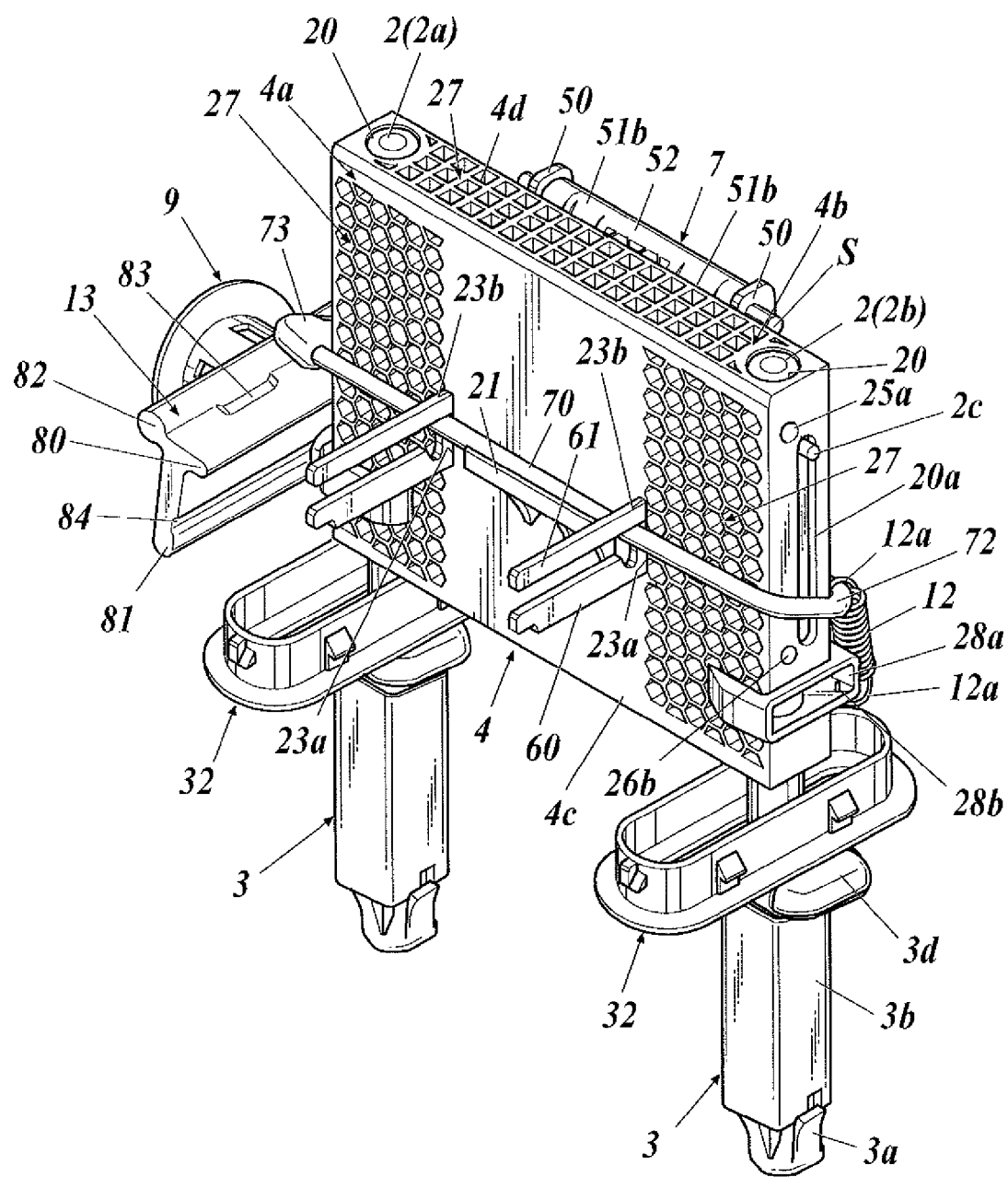
FIG. 8 is a perspective view showing an inner structure of the headrest before movement.
Figure 10:
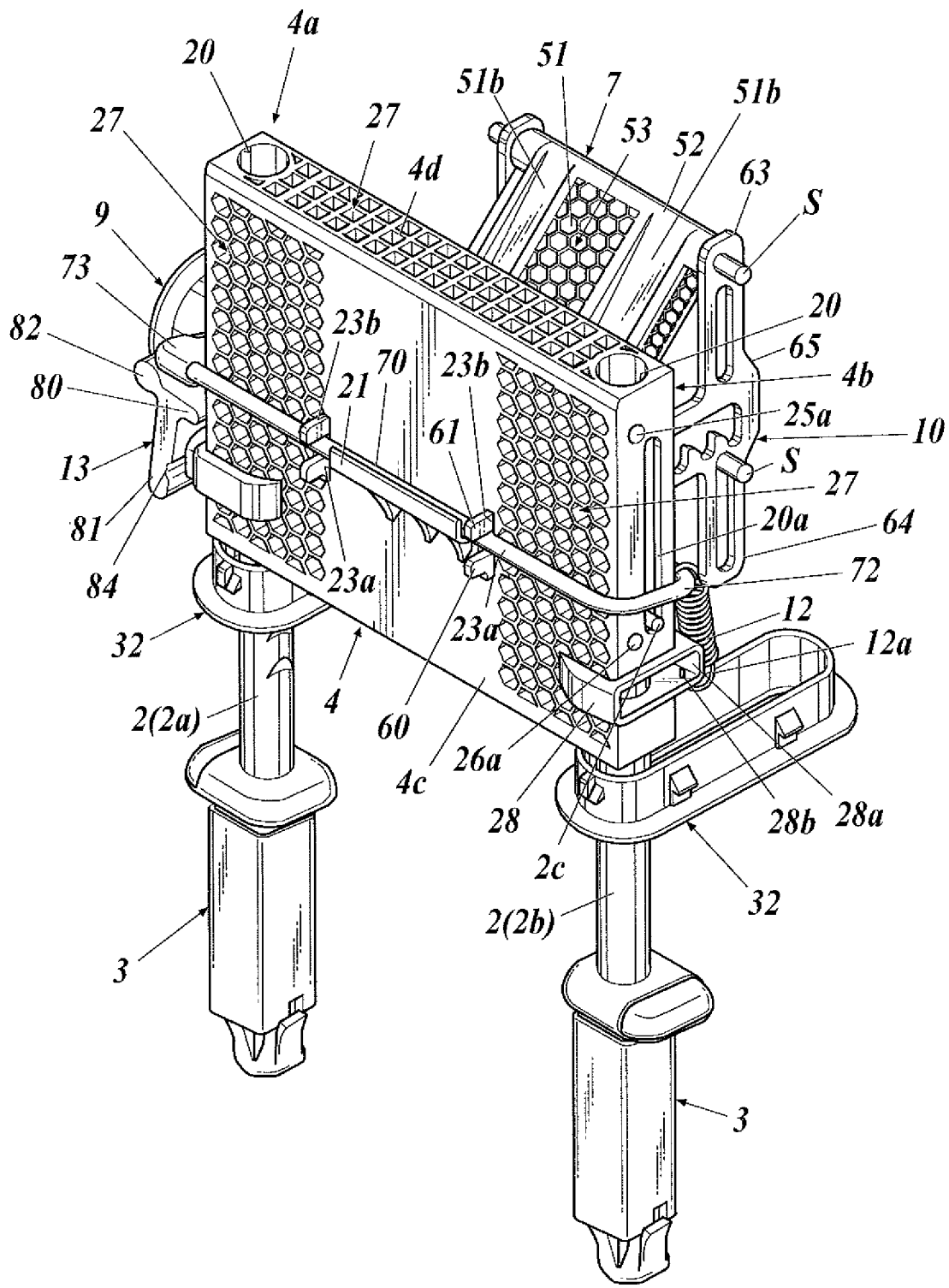
FIG. 10 is a perspective view showing the inner structure of the headrest after movement.

As shown in FIGS. 6, 8 and 10, the back side connector 4c has through holes 23a and 23b at positions corresponding to first protruding units 60 and second protruding units 61 (will be described later) of the to-be-engaged units 10 constituting the front-back locking mechanism, and the first protruding units 60 and the second protruding units 61 are respectively inserted in the through holes 23a and 23b.

Figure 12:
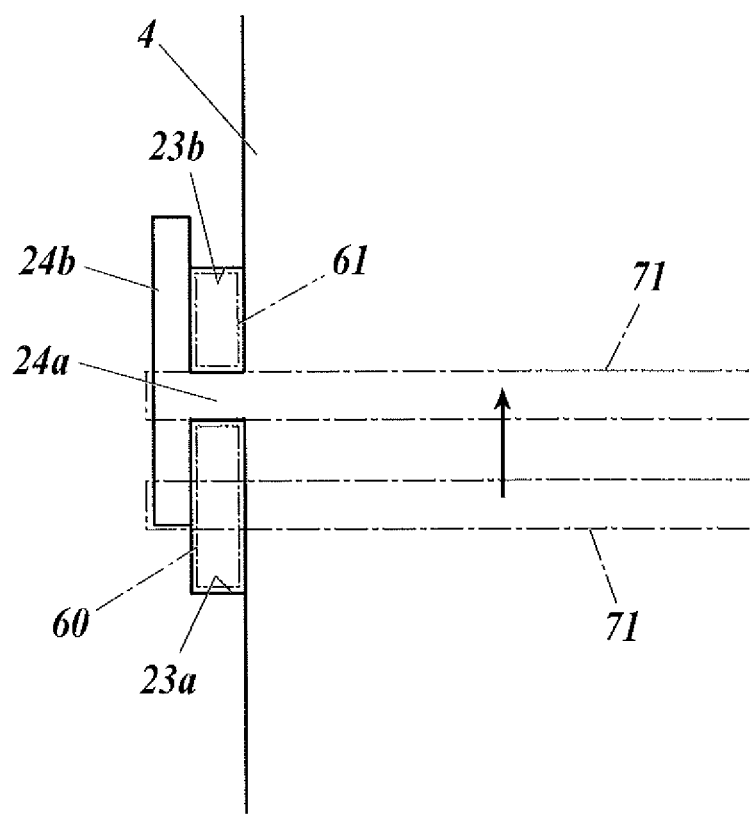
FIG. 12 is an enlarged front view showing a section near a through hole formed in an affixed-side member.

As shown in FIG. 12, walls 24a and 24b facing the first protruding units 60 and the second protruding units 61 are arranged around the circumferences of the through holes 23a and 23b. The walls 24a are arranged between the through holes 23a and 23b and the walls 24b are arranged so as to face the surfaces of the pair of pillar holding units 4a and 4b that are facing each other. The surfaces of the pair of pillar holding units 4a and 4b that are facing each other also has the function similar as that of the walls 24a and 24b.

A plurality of supporting units 25 and 26 are connected with the inner-side link member 6 and the outer-side link member 7 which constitute the X linkage mechanism so that the inner-side link member 6 and the outer-side link member 7 rotate, and the plurality of supporting units 25 and 26 support the inner-side link member 6 and the outer-side link member 7.

The plurality of supporting units 25 and 26 are respectively arranged at the upper sides and the lower sides of the surfaces of the pair of pillar holding units 4a and 4b that are facing each other. That is, the plurality of supporting units 25 and 26 are respectively arranged at the four corners of the concave unit 22.

The supporting units 25 and 25 which are arranged at the upper side are formed integrally with the pair of pillar holding units 4a and 4b, the back side connector 4c and the connector 4d. The supporting units 26 and 26 which are arranged at the lower side are formed integrally with the pair of pillar holding units 4a and 4b and the back side connector 4c.

The plurality of upper side supporting units 25 and 25 respectively have through holes 25a in which a connecting member S is to be inserted, the through holes 25a being formed so as to penetrate the pair of pillar holding units 4a and 4b from the surfaces of the plurality of supporting units 25 on the concave unit 22 side. The through holes 25a of the plurality of upper side supporting units 25 and 25 are round holes.

The connecting member S is inserted in the round hole 25a which is opened on the side of the pillar holding unit 4a (4b) which is one of the pair of pillar holding units 4a and 4b so as to connected the link member 6 (7).

The connecting members S connect the inner-side link member 6 and the outer-side link member 7 to the plurality of supporting units 25 and 26 so as to rotate. In the embodiment, metallic shafts (rotary shafts) are used. That is, the connecting member S is arranged so as to go through the link member 6 (7) and the supporting units 25 and 25.

The plurality of lower side supporting units 26 and 26 are formed to be longer in the up and down directions comparing to the plurality of upper side supporting units 25 and 25.

The plurality of supporting units 26 and 26 respectively have through holes 26a in which a connecting member S is to be inserted, the through holes 26a being formed on the surfaces of the plurality of supporting units 26 and 26 in the concave unit 22 side. The holes 26a of the plurality of lower side supporting units 26 and 26 are elongated holes (slits) which are elongated in the up and down directions along the plurality of lower side supporting units 26 and 26.

Parts 26b of the elongated holes 26a are formed so as to penetrate the pillar holding units 4a and 4b forming a pair. The parts 26b of the elongated holes 26a are round holes. The connecting member S is inserted from the part 26b of the elongated hole 26a which opens on a side of the pillar holding unit 4a (4b) which is one of the pillar holding units 4a and 4b forming a pair so as to connect the link member 7 (6). The connecting member S is arranged so as to go through the link member 7 (6) and the supporting units 26 and 26.

The plurality of reinforcement units 27 . . . are arranged at a plurality of parts in the affixed-side member 4. Among the plurality of reinforcement units 27, at least one is formed in a honeycomb structure.

In the embodiment, the front surfaces and the back surfaces of the pillar holding units 4a and 4b forming a pair are the reinforcement units 27 having the honeycomb structure. By forming at least one of the plurality of the reinforcement units 27 of the affixed-side member 4 in the honeycomb structure, the affixed-side member 4 can be lighter and can be reinforced so that it is not easily bent.

Although it is not the honeycomb structure, a reinforcement unit 27 is also formed in the upper surface of the connector 4d. The reinforcement unit 27 of the connector 4d has ribs arranged in a grid pattern.

The lock holding units 28 hold the up-down locking member 14 which constitutes the up-down locking mechanism and are respectively arranged near the lower ends of the pillar holding units 4a and 4b forming a pair. The up-down locking member 14 is provided at either one of the pillar holding units 4a and 4b forming a pair. In the embodiment, the up-down locking member 14 is arranged on the left side of the headrest 1.

The lock holding unit 28 has an opening 28a formed on a side and the up-down locking member 14 is provided through the opening 28a.

With respect to the lock holding unit 28 on the side which the up-down locking member 14 is not provided, the pillar 2b (2a) can be seen through the opening 28a on the side.

Further, the lock holding units 28 are provided with catch units 28b to which the hook units 12a of the biasing units 12 (after-mentioned) are to be hooked. The catch units 28b of the embodiment are hole units which are formed in the under surface of the front parts of the lock holding units 28.

(Movable-Side Member)

The movable-side member 5 is arranged on the side of the passenger's head and can be moved in the front and back directions with respect to the affixed-side member. In particular, as shown in FIGS. 2 to 5 and FIGS. 7 to 11, the movable-side member 5 is movable in the front and back with respect to the affixed-side member 4.

The movable-side member 5 is made of resin. The movable-side member 5 includes a front cover 30, a back cover 31, lower edge covers 32 and 32, a holding unit 33, a button attaching unit 34, a plurality of supporting units 35 and 36, a reinforcement rib 37 and concave units 38 and 38. With respect to the movable-side member 5, the front cover 30, the back cover 31 and the lower edge covers 32 and 32 are formed separately.

By assembling the front cover 30 and the back cover 31, a hollow case body can be formed.

The front cover 30 is provided to support the head. The front cover 30 includes a front side unit 30a and a surrounding unit 30b which is provided toward the back from the surrounding edges (up, down, left and right) of the front side unit 30a. The parts constituting the front cover 30 are formed integrally.

Figure 4:
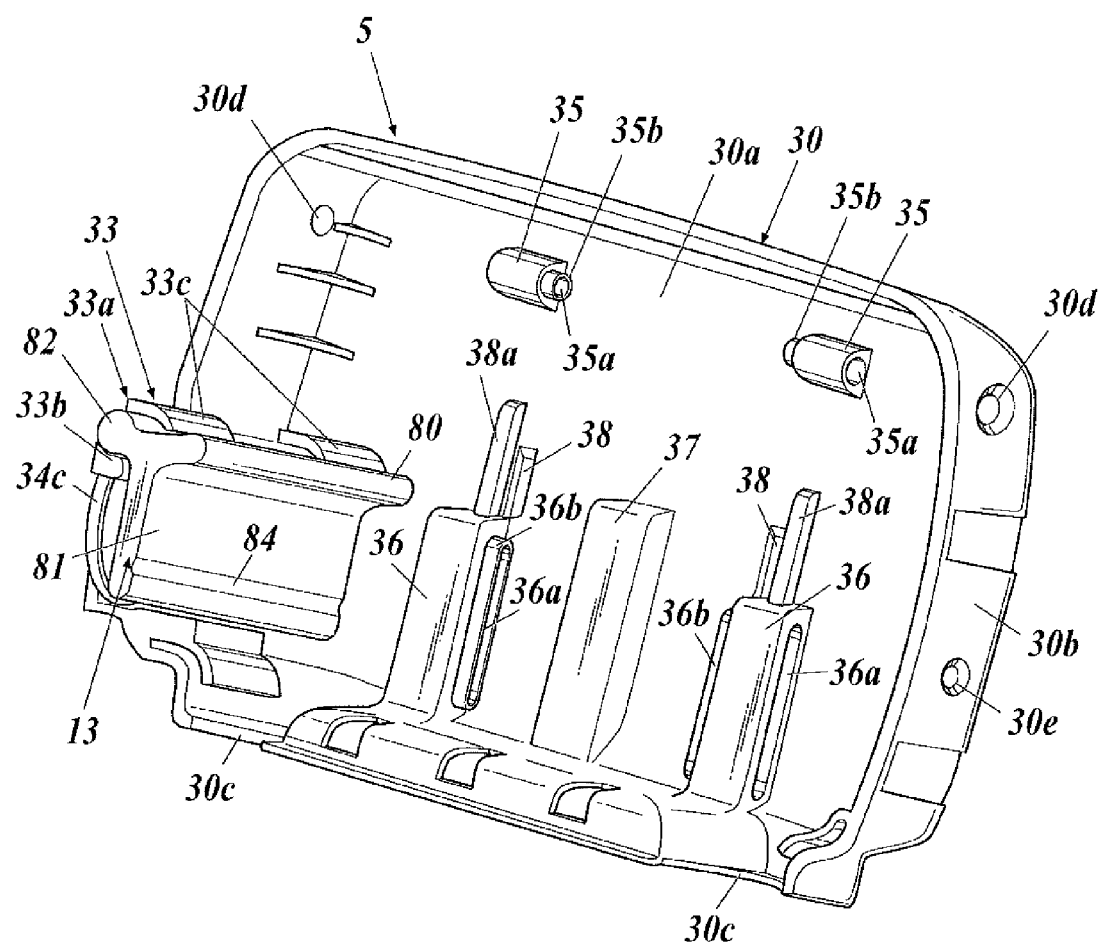
FIG. 4 is a perspective view showing the back surface side of the front cover and a rotary operation member.
Figure 5:
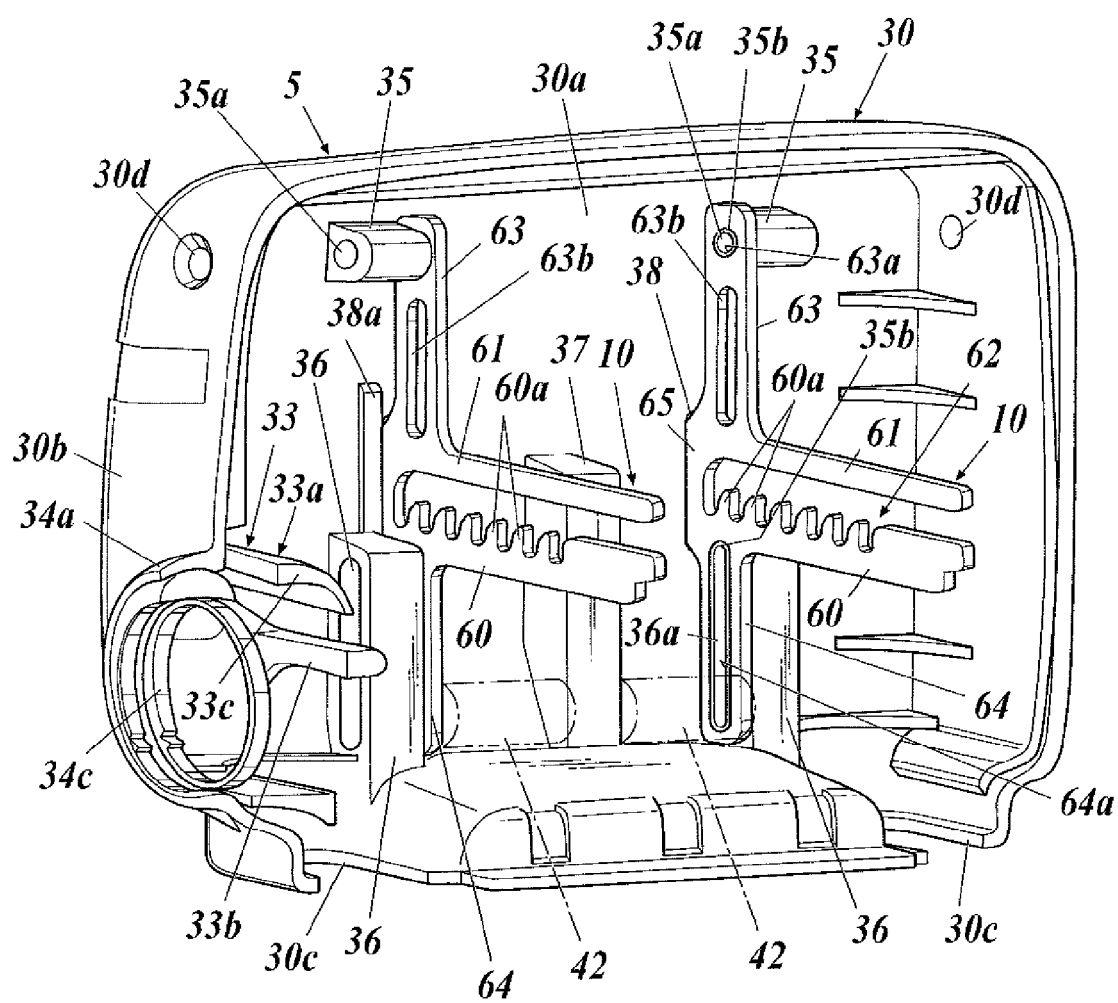
FIG. 5 is a perspective view showing the back surface side of the front cover and a to-be-engaged unit.

As shown in FIGS. 4 and 5, ribs for reinforcing the boundary parts of the front side unit 30a and the surrounding unit 30b are arranged as needed between the back side of the front side unit 30a and the surrounding unit 30b.

The back cover 31 includes a back side unit 31a and a surrounding unit 31b which is provided toward the front from the surrounding edges (up, down, left and right) of the back side unit 31a. The case body is constituted by connecting and fixating the surrounding unit 31b of the back cover 31 and the surrounding unit 30b of the front cover 30 together.

By adapting a fitting mechanism, the surrounding unit 30b and the surrounding unit 31b are connected by being fitted to each other. However, this is not limitative in anyway. Any known technique can be adopted.

Figure 13:
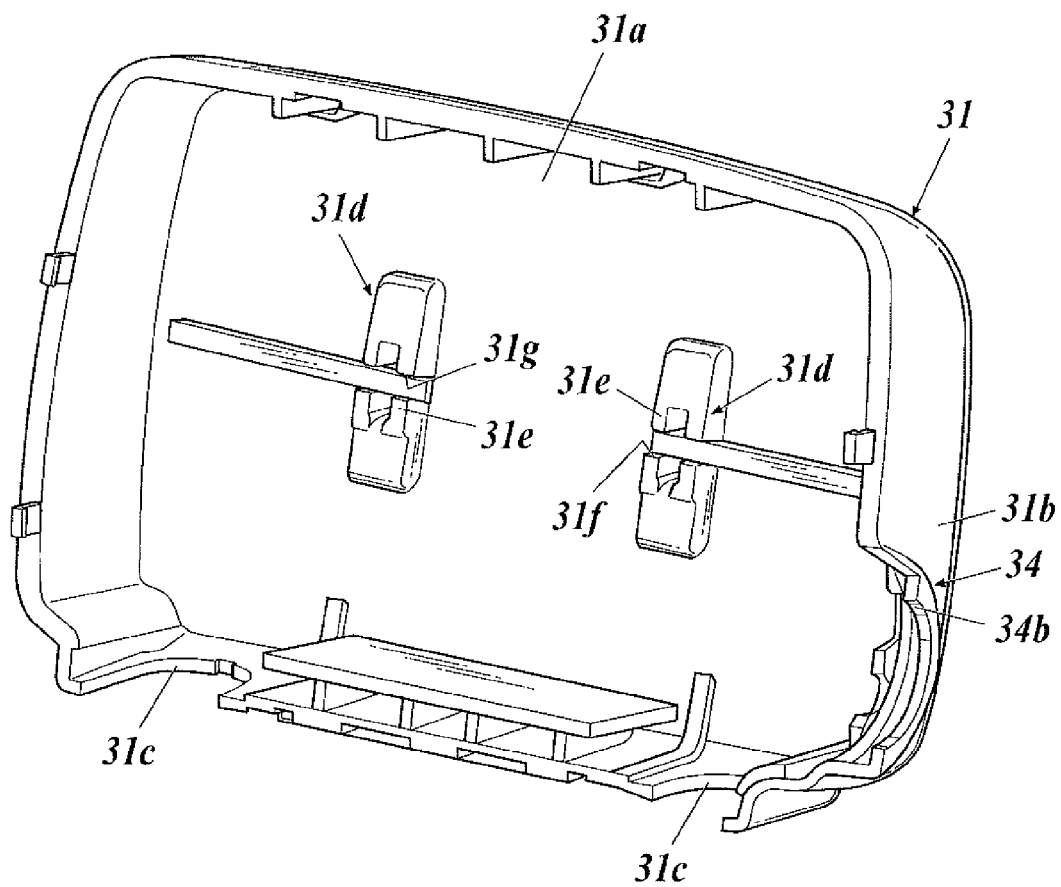
FIG. 13 is a perspective view showing the front surface side of the back cover.

As shown in FIG. 13, the back cover 31 is arranged at the position corresponding to the tips of the first protruding units 60 and the tips of the second protruding units 61 of the to-be-engaged unit 10 (after-mentioned), and the back cover 31 is provided with tip housing units 31d and 31d in which the above mentioned tips are to be housed.

The tip housing units 31d and 31d are formed so as to protrude from the front surface of the back cover 31. The tip housing units 31d and 31d respectively includes wall units 31e which surround the tips of the first protruding units 60 and the tips of the second protruding units 61 and slits 31f which prevent the to-be-held units 70 of the lock member 11 (after-mentioned) from interfering with the wall units 31e.

The lower edge covers 32 and 32 are respectively fitted to the two elongated holes (will be described later) which are formed in the lower surface of the case body which is formed by connecting the front cover 30 and the back cover 31. Each lower edge cover 32 includes a cylindrical unit 32a which is to be inserted in an elongated hole and a collar unit 32b which is arranged at the lower edge unit of the cylindrical unit 32a and abuts the lower surface of the case body.

The lower surfaces of the surrounding unit 30b and the surrounding unit 31b include cutouts units 30c and 31c for inserting the pair of pillars 2a and 2b and the lower edge covers 32 and 32. Each of the cutout units 30c and 31c is formed in a shape where an elongated hole is cut in half. Elongated holes are to be formed in the lower surface of the case body by the surrounding unit 30b and the surrounding unit 31b being connected to each other.

Two elongated holes are formed in the lower surface of the case body, and the elongated holes are arranged so that they are elongated along the front-to-back moving direction of the movable-side member 5. The cylindrical units 32a are also arranged so that they are elongated along the front-to-back moving direction of the movable-side member 5.

The holding unit 33 is for holding the rotary shaft unit 82 of the rotary operation member 13 (after-mentioned). As shown in FIGS. 4 and 5, the holding unit 33 is provided inside (in the inside space of the case body) the surrounding unit 30b of the front cover 30 on either left or right side thereof.

The holding unit 33 includes a plurality of upper abutting units 33a which abut the rotary shaft unit 82 from above and a lower abutting unit 33b which abuts the rotary shaft unit 82 from below. The upper abutting units 33a include a plurality of claw units 33c and 33c which are the tip parts of the upper abutting units 33a.

The upper abutting units 33a and the lower abutting unit 33b are formed so as to protrude toward the back cover 31 side from the front cover 30 side.

As shown in FIGS. 2 to 5, the button attaching unit 34 is for attaching the button 9 which is the operation unit 9 to the front cover 30 and the back cover 31. The button attaching unit 34 is arranged at one side of the front cover 30 and the back cover 31.

The button attaching unit 34 is a cylindrical body which protrudes from a side of the front cover 30 and the back cover 31. The button attaching unit 34 includes a cylindrical front unit 34a which is arranged on the front cover 30 side, a cylindrical back unit 34b which is arranged on the back cover 31 side and a ring-shaped button holding unit 34c which is arranged inside the front cover 30 and holds the button 9.

The button 9 is to be surrounded by the cylindrical front unit 34a of the front cover 30 and the cylindrical back unit 34b of the back cover 31 in a state where the button 9 is being held by the button holding unit 34c. In such way, the button 9 is attached to the button attaching unit 34.

To the plurality of supporting units 35 and 36, the inner-side link member 6 and the outer-side link member 7 which constitute the X linkage mechanism are connected so as to rotate. The plurality of supporting units 35 and 36 support the inner-side link member 6 and the outer-side link member 7.

The plurality of supporting units 35 and 36 are arranged at the positions in the back surface of the front cover 30 corresponding to the front edges of the inner-side link member 6 and the outer-side link member 7. The plurality of supporting units 35 and 36 are arranged on both sides in the left and right directions (width) and both sides of the up and down directions on the back surface of the front cover 30. That is, the plurality of supporting units 35 and 36 are arranged at the four positions on the back surface of the front cover 30.

The front edges of the outer-side link member 7 are connected to the supporting units 35 and 35 which are arranged at the upper side and the front edges of the inner-side link member 6 are connected to the supporting units 36 and 36 which are arranged at the lower side.

On the surfaces of the plurality of supporting units 35 and 35 on the upper side that face each other, protruding units 35b and 35b which protrude toward the surfaces facing each other are respectively formed integrally. The protruding units 35b are for attaching the to-be-engaged unit 10 to the supporting units 35, and the protruding units 35b are to be engaged with the through holes 63a of the to-be-engaged unit 10 (after-mentioned).

The outside diameter of the protruding units 35b is set to be slightly smaller than the inside diameter of the through holes 63a and is set to be smaller than the diameter of the edges of the surfaces of the supporting units 35 which face each other.

On the surfaces of the plurality of lower side supporting units 36 and 36 that face each other, protruding units 36b and 36b which protrude toward the surfaces facing each other are respectively formed integrally. The protruding units 36b are for attaching the to-be-engaged unit 10 to the supporting units 36, and the protruding units 36b are to be engaged with the through holes 64a of the to-be-engaged unit 10 (after-mentioned).

The outside diameter of the protruding units 36b is set to be slightly smaller than the inside diameter of the through holes 64*a* and is set to be smaller than the diameter of the edges of the surfaces of the supporting units 36 which face each other.

In the plurality of upper side supporting units 35 and 35 and the protruding units 35*b* and 35*b*, through holes 35*a* in which the connecting member S is to be inserted are formed so as to penetrate in the left and right directions (width). Here, the through holes 35*a* of the plurality of upper side supporting units 35 and 35 are round holes.

On the left and right surfaces of the surrounding unit 30*b* of the front cover 30, through holes 30*d* and 30*d* are respectively formed at the positions on the lines extending from the through holes 35*a* and 35*a* of the plurality of upper side supporting units 35 and 35.

The connecting member S is inserted through the through holes 35*a* of the plurality of supporting units 35 and 35 and the protruding unit 35*b* and 35*b* from either one of the through holes 30*d* in the left and right side surfaces of the front cover 30 so as to connect the link member 7 (6) to the plurality of supporting units 35 and 35. That is, the connecting member S is arranged so as to go through the link member 7 (6), the supporting units 35 and 35 and the to-be-engaged units 10 and 10 which are attached to the supporting units 35 and 35.

The plurality of supporting units 36 and 36 and the protruding units 36*b* and 36*b* on the lower side are formed in elongated shapes elongated in the up and down directions comparing to the plurality of supporting units 35 and 35 and the protruding units 35*b* and 35*b* on the upper side.

In the plurality of lower side supporting units 36 and 36 and the protruding units 36*b* and 36*b*, the through holes 36*a* in which the connecting member S (after-mentioned) is to be inserted is formed so as to penetrate in the left and right directions (width). Here, the through holes 36*a* of the plurality of upper side supporting units 36 and 36 and the protruding units 36*b* and 36*b* are elongated holes elongated in the up and down directions along the supporting units 36 and 36.

On the left and right surfaces of the surrounding unit 30*b* of the front cover 30, through holes 30*e* and 30*e* are respectively formed at the positions on the lines extending from the elongated through holes 36*a* and 36*a* of the plurality of lower side supporting units 36 and 36. The through holes 30*e* and 30*e* are round holes arranged on the lines extending from the upper edges of the elongated through holes 36*a* and 36*a*.

The connecting member S is inserted through the through holes 36*a* of the plurality of supporting units 36 and 36 and the protruding unit 36*b* and 36*b* from either one of the through holes 30*e* on the left and right side surfaces of the front cover 30 so as to connect the link member 6 (7) to the plurality of supporting units 36 and 36. That is, the connecting member S is arranged so as to go through the link member 6 (7), the supporting units 36 and 36 and the to-be-engaged units 10 and 10 which are attached to the supporting units 36 and 36.

The reinforcement rib 37 is formed on the back surface of the front cover 30 at the center position between the plurality of supporting units 36 and 36.

The reinforcement rib 37 is formed so as to project toward the back, and the degree of its projection is set so as not to interfere with the connecting member S which is arranged at the plurality of the supporting units 36 and 36.

The part in the front surface of the front cover 30 corresponding to the part where the reinforcement rib 37 is formed is concaved corresponding to the projection of the reinforcement rib 37.

The reinforcement rib 37 and the front edges of the link (the inner-side link member 6 in the embodiment) are arranged in a line in the left and right sides of each other. That is, the reinforcement rib 37 is to be arranged between a first arm 40 and a second arm 41 of the inner-side link member 6 (after-mentioned).

The concave units 38 and 38 are formed on the back surface of the front cover 30 at position corresponding to frontward protruding units 65 and 65 of the to-be-engaged units 10 and 10 (after-mentioned).

The concave units 38 and 38 are arranged right above the plurality of lower side supporting units 36 and 36. At the outer edges of the concave units 38 and 38, the reinforcement ribs 38*a* and 38*a* are respectively formed integrally with the plurality of supporting units 36 and 36. The reinforcement ribs 38*a* and 38*a* are respectively facing the front side protruding units 65 and 65 of the to-be-engaged units 10 and 10.

(X Linkage Mechanism)

As shown in FIGS. 1, 3, 7 to 11, in the X linkage mechanism, the inner-side link member 6 is a link in which the upper edge (back edge) thereof is arranged on the affixed-side member 4 side and the lower edge (front edge) thereof is arranged on the movable-side member 5 side.

The outer-side link member 7 is a link in which the upper edge (front edge) thereof is arranged on the movable-side member 5 side and the lower edge (back edge) thereof is arranged on the affixed-side member 4 side.

The front and back directions of the inner-side link member 6 and the outer-side link member 7 can be reversed. The X linkage mechanism is made of resin except for the connecting member S.

The upper edge of the inner-side link member 6 is to be arranged between the plurality of upper side supporting units 25 and 25 which are arranged at the left and right sides in the affixed-side member 4.

The lower edge of the outer-side link member 7 is arranged between the plurality of lower side supporting units 26 and 26 which are arranged at the left and right sides in the affixed-side member 4.

The lower edge of the inner-side link member 6 is arranged between the plurality of lower side supporting units 36 and 36 which are arranged at the left and right sides in the movable-side member 5.

The upper edge of the outer-side link member 7 is arranged between the plurality of upper side supporting units 35 and 35 which are arranged at the left and right sides of the movable-side member 5.

Figure 7:
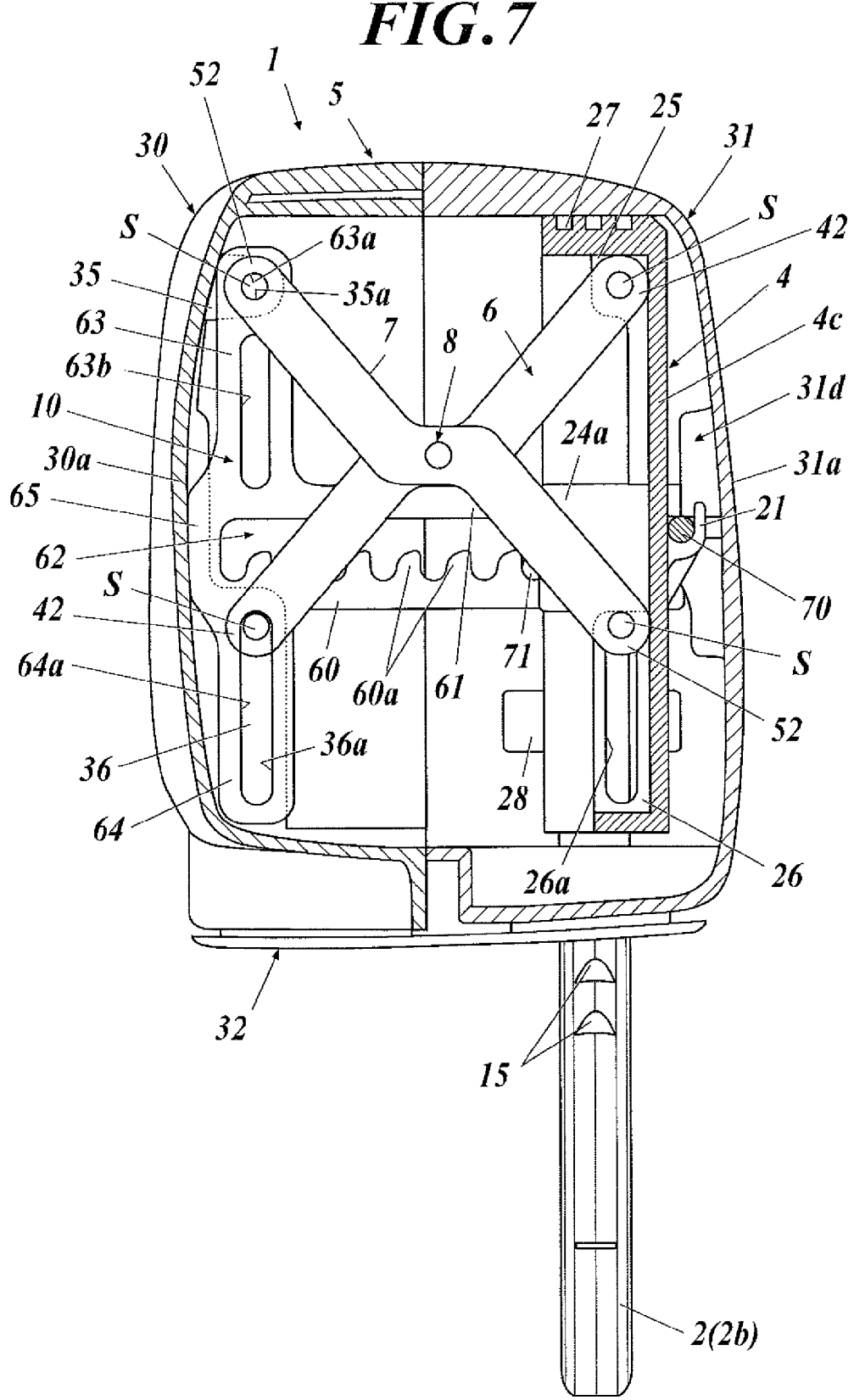
FIG. 7 is a cross-sectional view showing an inner structure of the headrest.

As shown in FIG. 7, the inner-side link member 6 and the outer-side link member 7 are in a bent shape when seen from a side.

The inner-side link member 6 and the outer-side link member 7 are connected via the center cross connection unit 8 so as to rotate.

In the X linkage mechanism, a part where one link and the other link overlap is naturally formed. Therefore, the cross connection unit 8 is arranged at the part where the inner-side link member 6 and the outer-side link member 7 overlap with each other, the overlapping part being naturally formed when constituting the X linkage mechanism.

The cross connection unit 8 is arranged on the line connecting the connecting members S and S respectively arranged at the upper edge and the lower edge of the inner-side link member and on the line connecting the connecting members S and S respectively arranged at the upper edge and the lower edge of the outer-side link member 7.

In the inner-side link member 6 and the outer-side link member 7, round holes which penetrate the inner-side link member 6 and the outer-side link member 7 are respectively formed at the parts corresponding to the cross connecting unit 8. A connecting member S is inserted in the round holes. That is, the inner-side link member 6 and the outer-side link member 7 are connected to each other so as to rotate with the connecting member S being the rotary shaft.

The inner-side link member 6 of the embodiment includes the first arm 40 and the second arm 41. That is, the two arms 40 and 41 constitute the inner-side link member 6 of the embodiment. The inner-side link member 6 further includes a plurality of connections 42 which are arranged at the edge parts of the first arm 40 and the second arm 41.

The first arm 40 and the second arm 41 are formed so to be symmetrical and are arranged to face the same direction having a space between each other. The inside unit 51 of the outer-side link member 7 is arranged in the space between the first arm 40 and the second arm 41.

The first arm 40 includes reinforcement units 43 at both the left and right sides thereof and the second arm 41 includes reinforcement units 44 at both the left and right sides thereof. These reinforcement units 43 and 44 are not the honeycomb structure. The reinforcement units 43 and 44 have a plurality of ribs arranged therein.

The plurality of connections 42 . . . are the upper and lower edges of the first arm 40 and the second arm 41, and are the parts connected to the upper side supporting units 25 and 25 of the affixed-side member 4 and the lower side supporting units 36 and 36 of the movable-side member 5 and supported by the upper side supporting units 25 and 25 and the lower side supporting units 36 and 36.

Through holes are formed in the connections 42 and 42 at the upper edges of the first arm 40 and the second arm 41 so as to penetrate the connections 42 and 42, in which the connecting member S is to be inserted, in the left and right directions (width). The through holes are round holes.

Since the connecting members S is to be inserted in the through holes, the through holes are arranged on the line extending from the through holes 25a and 25a that are formed in the plurality of upper side supporting units 25 and 25 of the affixed-side member 4. The connecting member S is inserted in the round holes of the upper side supporting units 25 and 25 and the round holes of the connections 42 and 42 at the upper edges. That is, the first arm 40 and the second arm 41 are connected to the affixed-side member 4 via the connecting member S so as to rotate, the connecting member S being the rotary shaft.

Similarly, through holes (round holes) are formed in the connections 42 and 42 at the lower edge parts of the first arm 40 and the second arm 41.

The connecting member S is inserted in the plurality of the elongated holes 36a and 36a of the plurality of lower side supporting units 36 and 36 of the movable-side member 5 and the round holes of the connections 42 and 42 at the lower edges. That is, the first arm 40 and the second arm 41 are connected to the movable-member 5 via the connecting member S so as to rotate, the connecting member S being the rotary shaft.

The connecting member S arranged at the connections 42 and 42 at the lower edges of the first arm 40 and the second arm 41 can move in the up and down directions along the elongated holes 36a and 36a formed in the plurality of lower side supporting units 36 and 36. That is, the lower edges of the first arm 40 and the second arm 41 can move in the up and down directions along the lower side supporting units 36 and 36 according to the front-to-back movement of the movable-side member 5.

The reinforcement rib 37 is arranged between the connection 42 at the lower edge of the first arm 40 and the connection 42 at the lower edge of the second arm 41.

The outer-side link member 7 of the embodiment includes left and right side wall units 50 and 50, an inside unit 51 arranged between the left and right side wall units 50 and 50, a plurality of connections 52 . . . and a plurality of reinforcement units 53 . . . . The left and right side wall units 50 and 50, the inside unit 51, the plurality of connections 52 and 52 and the plurality of reinforcement units 53 . . . are formed integrally.

The left and right side wall units 50 and 50 are the parts positioning outside of the first arm 40 and the second arm 41 of the inner-side link member 6. The left and right side wall units 50 and 50 are arranged so as to intersect with the first arm 40 and the second arm 41 and sandwich the first arm 40 and the second arm 41.

The inside unit 51 is the part that intersects with the first arm 40 and the second arm 41 of the inner-side link member 6 and sandwiched by the left and right side wall units 50 and 50.

At the part of the inside unit 51 where intersects with the first arm 40 and the second arm 41, arm inserting holes 51a and 51a in which the first arm 40 and the second arm 41 are to be inserted are formed.

The arm inserting holes 51a and 51a are formed in a size in which the inside unit 51 does not interfere with the first arm 40 and the second arm 41 when the inner-side link member 6 and the outer-side link member 7 are folded.

When the movable-side member 5 is returned to the affixed-side member 4 side, the inside unit 51 abuts the first arm 40 and the second arm 41. The parts of the inside unit 51 where abut the first arm 40 and the second arm 41 are formed in a concaved shape (concave units 51b). When the movable-side member 5 is returned to the affixed-side member 4 side, the first arm 40 and the second arm 41 are to be housed in the concave units 51b of the inside unit 51. In such way, the inner-side link member 6 and the outer-side link member 7 can be folded in a compact manner.

The concave units 51b are formed respectively at the upper left and right edges of the inside unit 51 on its back surface and at the lower left and right edges of the inside unit 51 on its front surface.

The plurality of connections 52 and 52 are the upper and lower edges of the outer-side link member 7 and are the parts that are connected to the lower side supporting units 26 and 26 of the affixed-side member 4 and the upper side supporting units 35 and 35 of the movable-side member 5 and supported by the lower side supporting units 26 and the upper side supporting unit 35 and 35.

Through holes in which the connecting member S is to be inserted are formed in the connections 52 and 52 so as to penetrate the connections 52 and 52 in the left and right directions (width). The through holes are round holes.

The connecting member S is to be inserted in the through holes. Therefore, the through holes are respectively formed on the line extending from the through holes 26a and 26a which are formed in the plurality of lower side supporting units 26 and 26 of the affixed-side member 4 and on the line extending from the through holes 35a and 35a which are formed in the plurality of upper side supporting units 35 and 35 of the movable-side member 5.

The connecting member S is inserted in the elongated holes of the lower side supporting units 26 and 26 and the round holes of the connections 52 at the lower edges.

The connecting member S which is arranged in the connections 52 at the lower edges can move in the up and down directions along the elongated holes 26a and 26a which are formed in the plurality of lower side supporting units 26 and 26. That is, the lower edge of the outer-side link member 7 can move in the up and down directions along the lower side supporting units 26 and 26 according to the front-to-back movement of the movable-side member 5.

The connecting member S is inserted in the round holes of the upper side supporting units 35 and 35 and the round holes of the connections 52 at the upper edges. That is, the upper edge of the outer-side link member 7 is connected to the movable-side member 5 via the connecting member S so as to rotate, the connecting member S being the rotary shaft.

The plurality of reinforcement units 53 are arranged at a plurality of parts in the outer-side link member 7, and at least one of the plurality of reinforcement units 53 is formed in the honeycomb structure.

In the embodiment, the plurality of reinforcement units 53 are arranged on the side of the outer-side link member 7 which is the opposite side of the side on which the concave units 51b are formed, that is, the plurality of reinforcement units 53 are arranged at the upper left and right edges on the front surface of the inside unit 51 and at the lower left and right edges on the back surface of the inside unit 51. In the inside unit 51, the reinforcement units 53 are provided on the back surface and the front surface at the upper sections of the part positioning between the first arm 40 and the second arm 41 of the inner-side link member 6.

In the embodiment, all of the reinforcement units 53 have the honeycomb structure.

By adapting the above described configuration, the movable-side member 5 can be moved so as to apart from the affixed-side member 4 in the forward direction and so as to approach the affixed-side member 4 in the backward direction via the X linkage mechanism which is the moving mechanism.

Next, the front-back locking mechanism and the up-down locking mechanism will be described in detail.

(Front-Back Locking Mechanism)

As described above, the front-back locking mechanism includes the to-be-engaged units 10, the locking member 11 which engages with the to-be-engaged units 10, the biasing units 12 which bias the locking member 11 toward the to-be-engaged units 10, and the rotary operation member 13 which operates the locking member 11, the rotary operation member 13 being held at the movable-side member 5 so as to rotate freely.

The to-be-engaged units 10 are made from metal, and as shown in FIGS. 1, 3 and 5, for example, the to-be-engaged units 10 are attached on the back surface of the front cover 30 and protrude toward the affixed-side member 4 from the back surface of the front cover 30.

A plurality of to-be-engaged units 10 are used and they are arranged so as to have the X linkage mechanism between them.

Each of the to-be-engaged units 10 has the ratchet mechanism having a plurality of teeth 60a which are arranged in a line in the front and back directions. The plurality of teeth 60a are projected upward from below.

Each to-be-engaged unit 10 includes the first protruding unit 60, the second protruding unit 61, a space 62, attachment units 63 and 64 and the frontward protruding unit 65.

Each to-be-engaged unit 10 is formed in an approximately T-shape when seen from a side. That is, the first protruding unit 60 and the second protruding unit 61 are protruded in an approximately horizontal direction. The attachment unit 63 projects upward in approximately vertical direction and the attachment unit 64 projects downward in approximately vertical direction.

Each of the first protruding units 60 has a plurality of teeth 60a, and the to-be-engaged unit 10 is projected toward the affixed-side member 4 from the movable-side member 5 in a state being attached to the back surface of the front cover 30.

Each of the first protruding units 60 is arranged below the plurality of teeth 60a since the plurality of teeth 60a . . . which project upward from below are formed thereon. That is, the plurality of teeth 60a are formed so as to project upward from the upper edges of the first protruding units 60.

The tips of the first protruding units 60 are formed to have a taper shape and are to be housed in the tip housing units 31d of the back cover 31.

The second protruding units 61 are parallel to the first protruding units 60, respectively, and are arranged so as to have spaces between the upper edges of the plurality of teeth 60a. The spaces between the second protruding units 61 and the plurality of teeth 60a of the first protruding units 60 are the spaces 62.

The tips of the second protruding units 61 are to be housed in the tip housing units 31d of the back cover 31.

The through holes 63a and 64a in which the connecting members S are to be inserted are formed in the attachment units 63 and 64 and the attachment units 63 and 64 are attached to the front cover 30.

The attachment units 63 are formed so as to protrude upward from the base parts (front) of the second protruding units 61 and the attachment units 64 are formed so as to protrude downward from the base parts (front) of the first protruding units 60.

As described above, the through holes 63a are where the protruding units 35b and 35b of the plurality of upper side supporting units 35 and 35 are to be fitted, respectively. That is, by fitting the through holes 63a and the protruding units 35b, respectively, the attachment units 63 can be attached to the back surface of the front cover 30.

Each attachment unit 63 has a slit 63b formed below the through hole 63a. The slits 63b contribute to lightening of the to-be-engaged unit 10.

As described above, the through holes 64a are where the protruding units 36b and 36b of the plurality of lower side supporting units 36 and 36 are to be fitted, respectively. That is, by fitting the through holes 64a and the protruding units 36b, respectively, the attachment units 64 can be attached to the back surface of the front cover 30.

The through holes 64a are elongated holes which are elongated in the up and down directions corresponding to the shapes of the supporting units 36 and the protruding units 36b and the shape of the through holes 36a.

Figure 9:
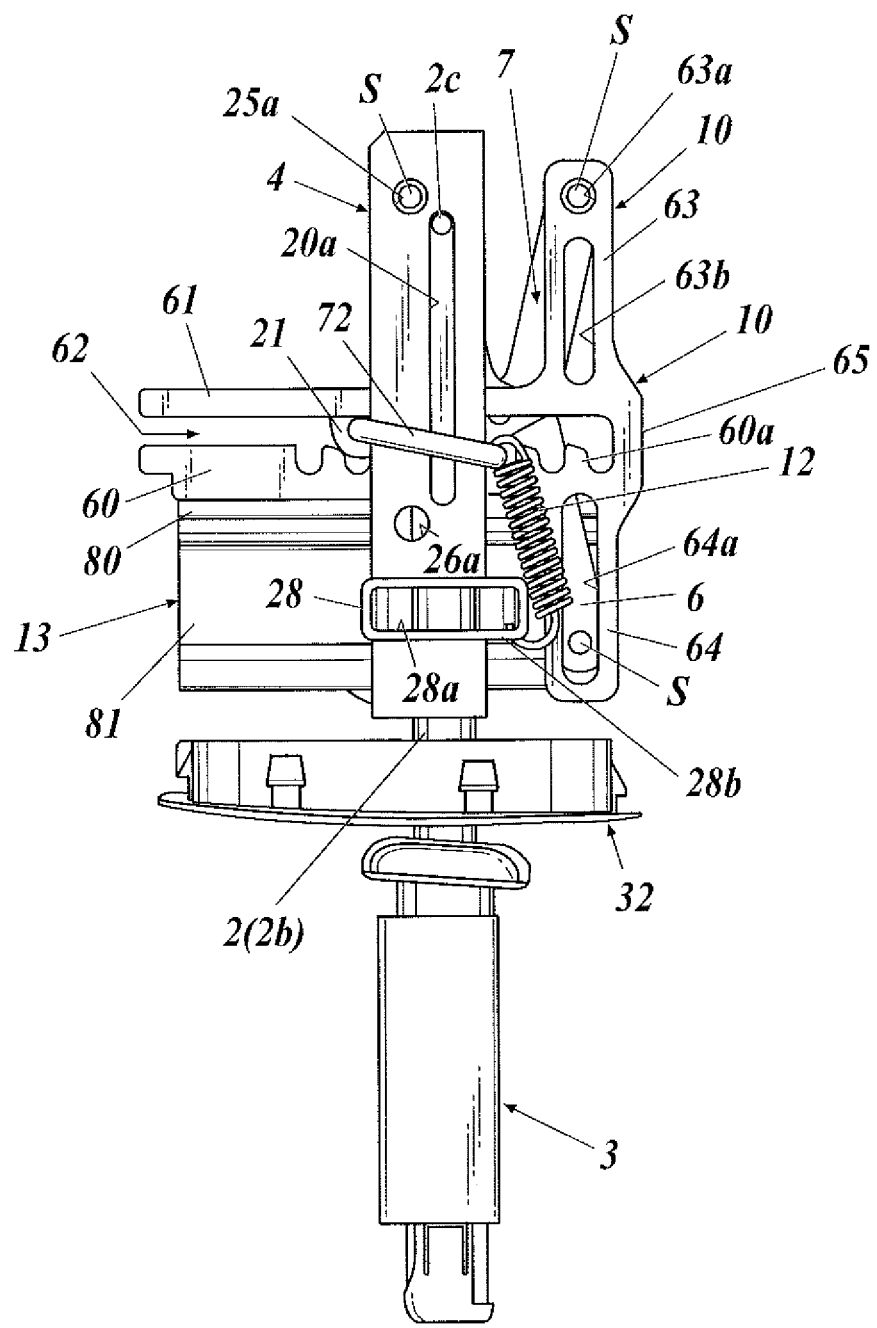
FIG. 9 is a side view showing the inner structure of the headrest before movement.
Figure 11:
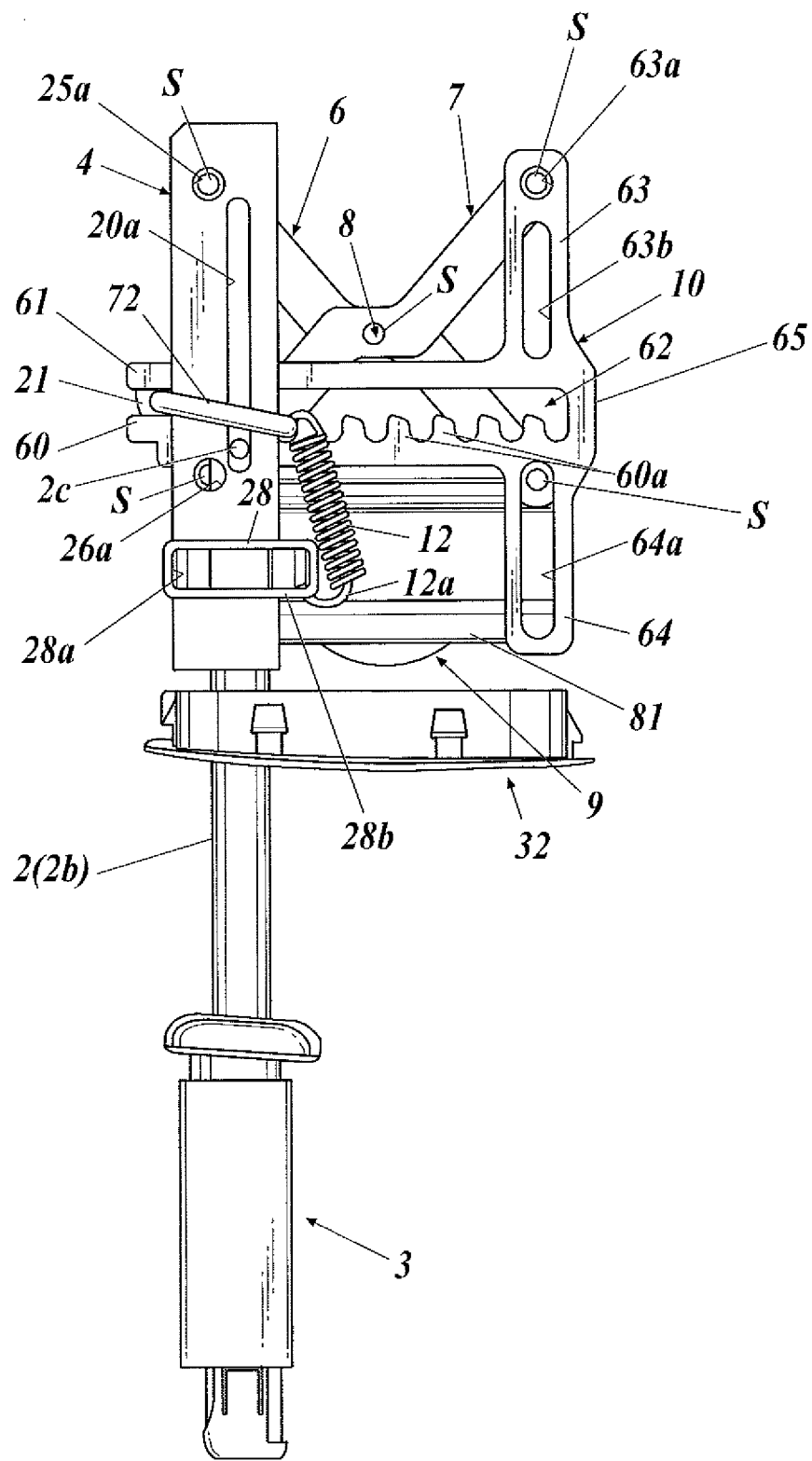
FIG. 11 is a side view showing the inner structure of the headrest after movement.

As shown in FIGS. 9 and 11, in each attachment unit 64, the through hole 64a and the tooth 60a at the front among the plurality of teeth 60a are aligned in the vertical direction.

The frontward protruding units 65 position in front of the to-be-engaged units 10, respectively, and they protrude frontward than the attachment units 63 and 64.

The frontward protruding units 65 are to be inserted respectively in the concave units 38 which are formed on the back surface of the front cover 30, and are arranged so as to face the reinforcement ribs 38a which are arranged at the outer edges of the concave units 38, respectively.

The locking member 11 engages with a to-be-engaged unit 10 to constitute the main part of the front-back locking mechanism with the to-be-engaged unit 10. As shown in FIGS. 1, 3, 6 to 12, the locking member 11 includes a to-be-held unit 70, engaging units 71 and 71 and connecting units 72 and 72.

The to-be-held unit 70 is a metallic shaft and is to be held by the affixed-side member 4. As shown in FIGS. 6 and 7, the to-be-held unit 70 is arranged at the back of the affixed-side member 4 and is held in a state being inserted in the holding unit 21 from the above, the holding unit 21 being arranged on the back surface of the affixed-side member 4.

The to-be-held unit 70 is arranged in the spaces 62 between the first protruding units 60 and the second protruding units 61. The to-be-held unit 70 is arranged above the engaging units 71 and 71.

The two ends of the to-be-held unit 70, there back surface sides, are inserted in the slits 31*f* of the tip housing units 31*d* of the back cover 31.

The engaging units 71 and 71 are metallic shafts, and they are arranged to be parallel to the to-be-held unit 70 and rotate around the to-be-held unit 70, the to-be-held unit 70 being the shaft, and they are biased toward the plurality of teeth 60*a* to be engaged with any of the plurality of teeth 60*a*. The engaging units 71 and 71 are arranged in front of the affixed-side member 4.

The engaging units 71 and 71 are arranged at the positions engaging with the plurality of teeth 60*a* by being biased by the biasing units 12. As shown in FIG. 12, in a case where the engaging units 71 and 71 move in the direction opposite to the biasing direction of the biasing units 12, the engaging units 71 and 71 are to move to the positions of the spaces 62.

With respect to the engaging units 71 and 71, the tip parts (front edges) thereof on the plurality of teeth 60*a* sides are protruded inside than the to-be-engaged units 10 and 10. However, the protruding lengths are set so as not to reach to the X linkage mechanism.

The connecting units 72 and 72 are metallic shafts, and they connect the edges of the to-be-held unit 70 and the edges of the engaging units. The connecting units 72 and 72 are arranged on the left and right sides of the affixed-side member 4. That is, the locking member 11 is formed in an approximately C shape so as to go around the circumference of the affixed-side member 4.

With respect to the connecting units 72 and 72, a cover member 73 which covers one connecting unit 72 and ends of the to-be-held unit 70 and the engaging unit 71 on the connecting unit 72 side is attached integrally at the one connecting unit on the side where the rotary operation member 13 is to be arranged. That is, the one connecting unit 72 includes the cover member 73.

As shown in FIG. 6, the cover member 73 of the connecting unit 72 abuts a side surface of the affixed-side member 4.

The cover member 73 of the embodiment covers one of the connecting units 72. However, the cover member 73 may be configured as a member where one end of the to-be-held unit 70 and one end of the engaging unit 71 are to be attached.

The cover member 73 of the connecting unit 72 includes a projecting abutting unit 74 which projects toward the rotary operation member 13 side and abuts the rotary operation member 13, the projecting abutting unit 74 being arranged at the part of the cover member 73 corresponding to the position of the engaging unit 71.

The projecting abutting unit 74 is formed in a round shape so as to correspond to the movement of the rotary operation member 13.

The cover member 73 includes a escape unit 75 which avoids the interference between the cover member 73 and the protruded unit 2*c* which is arranged at one of the pillars 2*a*.

This escape unit 75 is formed to have a concave shape at the position on the affixed-side member 4 side surface of the cover member 73 corresponding to the protruded unit 2*c*.

The biasing units 12 bias the engaging units 71 and 71 of the locking member 11 toward the to-be-engaged units 10 side. As shown in FIGS. 1, 3 and 8 to 12, coil-like tension springs are used in the embodiment.

With respect to each tension spring 12, the two ends thereof are hook units 12*a* and 12*a* which are formed in a hook-like shape. One of the hook units 12*a* and 12*a* is hooked to an engaging unit 71 and the other is hooked to a catch unit 28*b* which is arranged at a lock holding unit 28 of the affixed-side member 4. The tension springs 12 are respectively arranged between the engaging units 71 and the lock holding units 28. Further, a plurality of tension sprints 12 are arranged at both of the engaging units 71 and 71 of the locking member 11 and at both of the lock holding units 28 and 28 of the affixed-side member 4.

That is, the engaging units 71 and 71 are pulled toward the lock holding units 28 and 28 side by the tension springs 12 and 12. In such way, the engaging units 71 and 71 are in a state being biased toward the plurality of teeth 60*a* . . . side.

Figure 14:
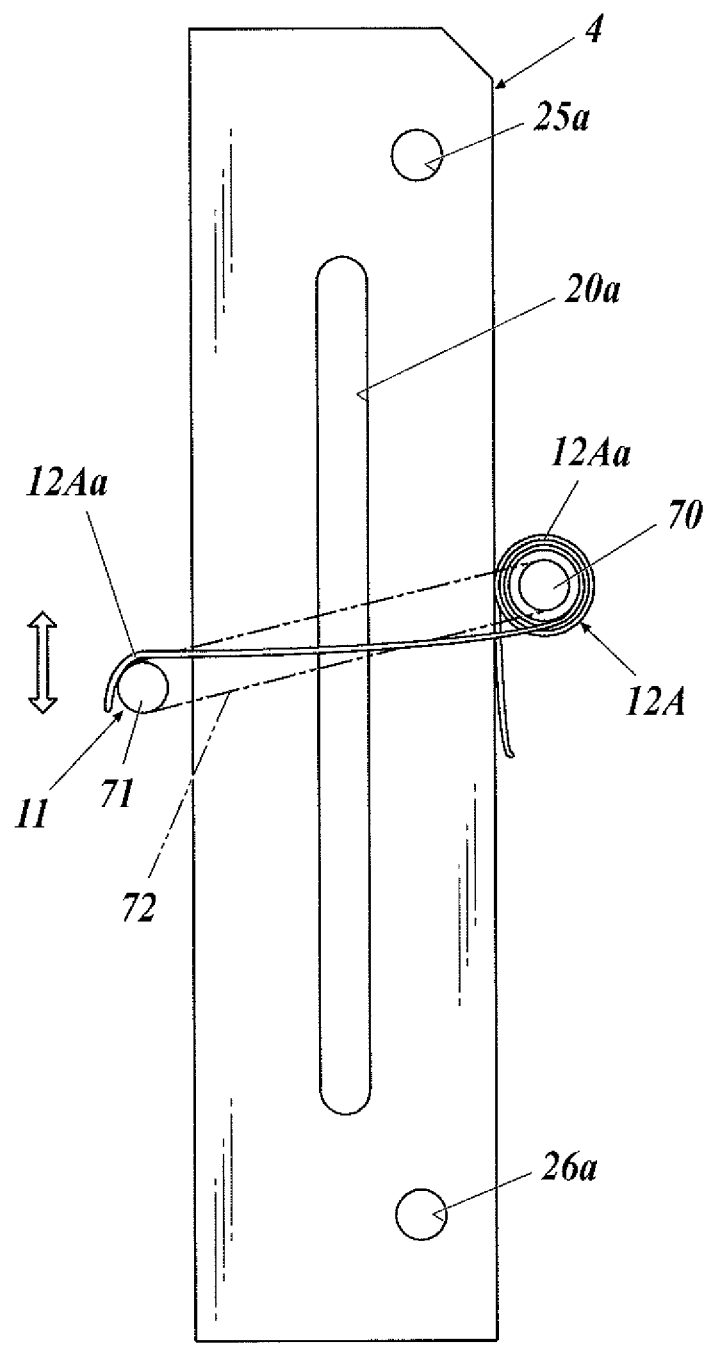
FIG. 14 is an outline view showing another example of a biasing unit.

The biasing units 12 of the embodiment are coil-like tension springs 12 which are arranged between the engaging unit 71 and the lock holding units 28. However, this is not limitative in any way. For example, as shown in FIG. 14, a winding spring 12A having a tip 12Ab which extends toward the front surface side from the back surface side of the affixed-side member 4 may be used.

With respect to such winding springs 12A, the main bodies 12Aa are to be arranged on the back surface side of the affixed-side member 4 and are fixed there by being wounded around the to-be-held unit 70. The tip units 12Ab go over the side surfaces of the affixed-side member 4 and are hooked to the engaging units 71. In such way, the engaging units 71 can be engaged with the plurality of teeth 60*a* of the to-be-engaged units 10.

The rotary operation member 13 is made of resin. As shown in FIGS. 1, 3, 4 and 6, for example, the rotary operation member 13 is held by the movable-side member 5 so as to rotate freely and operates the engaging unit 71 of the locking member 11. That is, the rotary operation member 13 rotates in the direction to operate the engaging units 71 in the direction which is opposite to the biasing direction of the tension sprints 12 and to release the engaged state with the plurality of teeth 61*a*.

The rotary operation member 13 is arranged in the direction in which the engaging units 71 of the locking member 11 are biased by the tension springs 12.

The rotary operation member 13 includes a first operation unit 80, a second operation unit 81 and a rotary shaft unit 82 which is the rotary shaft. The first operation unit 80, the second operation unit 81 and the rotary shaft unit 82 are formed integrally.

The rotary shaft unit 82 is formed in a column shape and is held by the upper abutting unit 33*a* and the lower abutting unit 33*b* of the holding unit 33 abutting the outer circumference surface of the column shape.

The assembling direction of the rotary operation member 13 to the holding unit 33 is set so as to correspond to the rotary shaft direction of the rotary operation member 13 (that is, the length direction of the rotary shaft unit 82). That is, the rotary operation member 13 is configured so as not to be pulled out easily in directions other than the direction which is opposite to the assembling direction (that is, the projection direction of the holding unit 33) in a state where the rotary operation member 13 is held by the holding unit 33.

The rotary shaft unit 82 is arranged below the front-back locking mechanism and is arranged above the up-down locking mechanism.

The first operation unit 80 is for operating the front-back locking mechanism. The first operation unit 80 is formed so as to protrude toward the affixed-side member 4 from the part of the outer circumference surface of the rotary shaft unit 82 which is within the range where the upper abutting unit 33a and the lower abutting unit 33b do not abut each other. The tip of the first operation unit 80 in the protruding direction is arranged below the cover member 73 of the locking member 11 and the upper surface of the first operation unit 80 is in contact with the projecting abutting unit 74.

The tip of the first operation unit 80 in the protruding direction is arranged below the rotary shaft unit 82. Therefore, when the first operation unit 80 is rotated upward with the rotary shaft unit 82 being the shaft, the cover member 73 can be moved upward.

The rotary operation member 13 includes concave units 83 and 83 in which the tips of the holding units 33 are to be inserted when the rotary operation member 13 rotates. That is, at the boundary part of the first operation unit 80 and the rotary shaft unit 82, the concave units 83 and 83, in which the plurality of claw units 33c and 33c of the upper abutting unit 33a of the holding unit 33 are inserted when the rotary operation member 13 rotates, are formed. Therefore, if the rotary operation unit 13 rotates upward, the claw units 33c and 33c are inserted in the concave units 83 and 83. Therefore, the rotational moving amount increases for that part.

The second operation unit 81 is for operating the up-down locking mechanism and is formed so as to project downward from the approximately center in the lower surface of the first operation unit 80. The tip of the second operation unit 81 in the projecting direction is arranged below the up-down locking member 14 and the approximate center of the second operation unit 81 in the projecting direction is at substantially the same height as the up-down locking member 14.

With respect to the surface of the second operation unit 81 on the affixed-side member 4 side, it is parted from the up-down locking member 14 when the up-down locking mechanism is locked and it is in contact with the up-down locking mechanism 14 when the up-down locking mechanism is unlocked. The surface of the second operation unit 81 which is the opposite to the surface on the affixed-side member 4 side is in contact with the button 9 (after mentioned).

By adapting the above configuration, movement of the movable-side member 5 in the front and back directions with respect to the affixed-side member 4 can be locked or unlocked at any of a plurality of positions, that is, at a position where the engaging unit 71 engages with any of the plurality of teeth 60a.

(Up-Down Locking Mechanism)

The up-down locking mechanism is provided with respect to the pair of pillars 2a and 2b. The up-down locking mechanism is to lock the affixed-side member 4 at any of the plurality of positions in the up and down directions with respect to the pair of pillars 2a and 2b.

The up-down locking mechanism includes a plurality of cutouts 15 . . . which are formed in at least one of the pillars 2a and 2b forming the pair, a pair of pillar holding units 4a and 4b, the up-down locking member 14 and the rotary operation member 13.

It is sufficient that the plurality of cutouts 15 are formed in at least one of the pillars 2a and 2b forming the pair, the one being the pillar to which the up-down locking member 14 is provided. However, since the plurality of cutouts 15 are to be used in the mechanism for preventing the pillars 2a and 2b from sliding out, the mechanism being configured by the lock units 3d and 3d of the pair of holder unit 3 and 3, in the embodiment, the plurality of cutouts 15 . . . are formed in both pillars 2a and 2b forming the pair.

As shown in FIGS. 1, 6 and 10, the plurality of cutouts 15 are formed in a multiple step manner along the length direction of the pillars 2a and 2b forming the pair. The plurality of cutouts 15 . . . are formed on the outer circumference surfaces of the pillars 2a and 2b forming the pair near the centers thereof.

As described above, the pillar holding units 4a and 4b forming the pair are for respectively holding the pillars 2a and 2b forming the pair. In such way, the affixed-side member 4 can move in the up and down directions along the pair of pillars 2a and 2b.

The up-down moving range of the affixed-side member 4 is based on the range where the projecting units 2c and 2c provided at the pillars 2a and 2b forming the pair can slide along the slits 31f and 31f which are formed on the sides of the affixed-side member 4.

The up-down locking member 14 is held by one of the lock holding units 28 and 28 which are respectively formed at the pillar holding units 4a and 4b forming the pair, the one being the lock holding unit 28 to which the rotary operation member 13 is arranged.

The up-down locking member 14 includes an engaging unit (not shown) which engages with a cutout 15 inside the lock holding unit 28 and a biasing member (not shown) which biases the engaging unit in the direction engaging with the cutout 15.

If the up-down locking member 14 is operated so as to be pushed in to the back of the lock holding unit 28, the engaging unit, which is not shown, parts from the cutout 15. If the up-down locking member 14 is not operated as described above, the engaging unit, which is not shown, is to be in the state engaging with the cutout 15.

The rotary operation member 13 includes the second operation unit 81 for operating the up-down locking member 14 as described above. On a side surface of the second operating member 81 that abuts the up-down locking member 14, a groove 84 which engages with the lower end of the up-down locking member 14 when abutting the up-down locking member 14 is formed.

The first operation unit 80 and the second operation unit 81 are interlinked to rotate. The second operation unit 81 can carry out the unlocking operation by the up-down locking mechanism at the same time when the first operation unit 80 carries out the unlocking operation of the front-back locking mechanism.

The length of the rotary operation member 13 in the front and back directions is set to be the length according to the moving distance of the movable-side member 5. That is, the first operation unit 80 is to be abutted by the projecting abutting unit 74 at all parts along its length direction. The second operation unit 81 is to be abutted by the button 9 at all parts along its length direction, and all parts of the second operation unit 81 abut the up-down locking member 14. The rotary shaft unit 82 is to be held by the holding unit 33 along its length direction.

Since all parts of the second operation unit 81 along its length direction are abutted by the button 9, the positional relation between the rotary operation member 13 and the button 9 changes according to moving of the movable-side member 5 in the front and back directions. However, the positional relation between the front cover 30 and the back cover 31 which are the movable-side member 5 and the button 9 does not change.

By adopting the above described configuration, the affixed-side member 4 can be locked or unlocked at any of the plurality of positions in the up and down directions with respect to the pair of pillars 2a and 2b, that is, at any of the positions where the plurality of cutouts 15 are formed.

The button 9 which is the operation unit 9 is to be attached to the button attachment unit 34 which is arranged on the sides of the front cover 30 and the back cover 31 as described above, and the button 9 abuts the rotary operation member 13. By the button 9 being pushed in to the inner space unit, the rotary operation member 13 can be operated.

The button 9 includes a button main body 90 and a cylindrical unit 91.

The button main body 90 is inserted in the cylindrical unit 91 and can freely move forward and backward along the cylindrical unit 91. The button main body 90 includes a surface unit 90a and a protruding unit 90b.

The surface unit 90a is the part where a person operating the button 9 directly touches.

The protruding unit 90b is arranged at the end part of the button main body 90 on the inner space unit side thereof and is the part that abuts the rotary operation member 13. In particular, the protruding unit 90b abuts the lower end (the end in the projecting direction) of the second operation unit 81 of the rotary operation unit 13.

The cylindrical unit 91 is held by being inserted in the button holding unit 34c of the button attaching unit 34. The cylindrical unit 91 includes a plurality of engaging claw units 91a which engage with the button, holding unit 34c when the cylindrical unit 91 is inserted in the button holding unit 34c.

By adapting the configuration as described above, the rotary operation member 13 can rotate upward with the rotary shaft unit 82 being the shaft. With this operation, the locking member 11 can be operated by the first operation unit 80 and the up-down locking member 14 can be operated by the second operation unit 81.

Next, operation of the headrest 1 having the above described configuration will be described.

The operation of the headrest 1 includes the operation of the movable-side member 5 moving forward in the direction parting from the affixed-side member 4 and moving backward so as to return from forwardly parted state. Further, the operation of the headrest 1 includes the operation of the affixed-side member 4 including the pair of pillar holding units 4a and 4b moving in the up and down directions along the pair of pillars 2a and 2b.

First, operation of the movable-side member 5 will be described.

FIGS. 8 and 9 show the state where the movable-side member 5 is near the affixed-side member 4. That is, the movable-side member 5 is in the state returned to the back although not totally to the very back. When the button 9 is not being operated, the engaging unit 71 is in the state engaging with the tooth 60a of the to-be-engaged unit 10, and the moving of the movable-side member 5 in the front and back directions is locked.

Starting from such state, in order to move the movable-side member 5 so as to part forwardly from the affixed-side member 4, first, the button 9 is pushed in to make the rotary operation member 13 rotate to the X linkage mechanism side. With such operating, the first operation unit 80 is rotated upward and the engaging unit 71 provided with the cover member 73 is pushed upward.

In such way, since the engaging units 71 part from the teeth 60a of the to-be-engaged units 10, the locking of the movement of the movable-side member 5 in the front and back directions by the locking member 11 can be unlocked.

Then, while maintaining the state where the engaging units 71 being pushed up, the movable-side member 5 is moved in the direction parting forwardly from the affixed-side member 4.

At this time, the to-be engaged units 10 move forward with the rotary operation of the inner-side link member 6 and the outer-side link member 7. At this time, the connecting member S of the inner-side link member 6 and the connecting member S of the outer-side link member 7 move upward along the elongated holes 26a and the elongated holes 36a of the plurality of lower supporting units 26 and 36.

When the operating of the button 9 is stopped at a desired position, the engaging units 71 return to the original positions by being biased toward the plurality of teeth 60a according to the biasing force of the tension springs 12 and engage with any of the plurality of teeth 60a. In such way, as shown in FIGS. 10 and 11, the movable-side member 5 can be moved to the direction parting forwardly from the affixed-side member 4 to lock the movement of the movable-side member 5 at a desired position.

At this time, there is a case where the engaging units 71 do not fit in the dents between the teeth 60a and 60a which are next to each other and come into contact with the tips near the teeth 60a. In such case, by the movable-side member 5 being moved in either front or back direction without operating the button 9, the engaging units 71 fall in the nearest dints and the movable-side member 5 can be locked.

Similarly, when the movable-side member 5 being returned to the back, first, the button 9 is pushed in and the cover member 73 is operated to unlock the locking by the engaging units 71.

Thereafter, it is sufficient to return the movable-side member 5 to the back and stop the operation of the button 9 at a desired position. At this time, the X linkage mechanism operates reversely from when the movable-side member 5 is moved to the front.

As described above, the movable-side member 5 can be moved in the front and back directions and a step-wise position adjustment according to the arrangement of the plurality of teeth 60a of the to-be-engaged units 10 can be realized. That is, the position adjustment of the headrest 1 in the front and back directions can be carried out in a step-wise manner.

Next, upward and downward operation of the affixed-side member 4 including the pair of pillar holding unit 4a and 4b will be described.

FIGS. 8 and 9 shows the state where the pair of pillar holding unit 4a and 4b are positioned at the downward side of the pair of pillars 2a and 2b. When the button 9 is not being operated, the engaging unit of the up-down locking member 14 is in the state being engaged with one cutout 15 at the lower side of the pillar 2a, and the movement of the pair of pillar holding units 4a and 4b in the up and down directions is locked.

Starting from such state, in order to move the pair of pillar holding units 4a and 4b upward along the pair of pillars 2a and 2b, first, the button 9 is pushed inside to make the rotary operation member 13 rotate toward the X linkage mechanism side. With this operation, the second operation unit 81 is rotated toward the X linkage mechanism side to push in the up-down locking member 14 to the back of the lock holding units 28, and the engaging units which are not shown are moved to the back of the lock holding units 28.

In such way, the engaging unit of the up-down locking member 14 parts from a cutout 15 of the pillar 2a. Therefore, the locking of the moving of the pair of pillar holding units 4a and 4b in the up and down directions by the engaging unit of the up-down locking member 14 can be unlocked.

Then, while maintaining the state where the engaging unit of the up-down locking member 14 is moved to the back of the lock holding unit 28, the pair of pillar holding units 4a and 4b is moved upward along the pair of pillars 2a and 2b and then the affixed-state member 4 is moved upward along the pair of pillars 2a and 2b.

At this time, the movable-side member 5, and the X linkage mechanism and the like move upward with the moving of the affixed-side member 4.

When the operation of the button 9 is stopped at a desired position, the engaging unit of the up-down locking member 14 returns to the original position due to the biasing force of the biasing member which is not shown, and engages with one cutout 15 at the upper side of the pillar 2a. In such way, as shown in FIGS. 10 and 11, the pair of pillar holding units 4a and 4b are moved upward along the pair of pillars 2a and 2b and the movement of the pair of pillar holding units 4a and 4b can be locked at a desired position.

At this time, there is a case where the engaging unit of the up-down locking member 14 does not fit in the dent between the cutouts 15 and 15 which are next to each other in the up and down directions and contacts the outer circumference of the pillar 2a. In such case, by moving the pair of pillar holding unit 4a and 4b in either up or down direction without operating the button 9, the engaging unit falls in the nearest cutout 15 and the pair of pillar holding units 4a and 4b can be locked.

Similarly, when moving the pair of pillar holding units 4a and 4b downward, first, the button 9 is pushed in to operate the second operation unit 81 so that the locking by the engaging unit of the up-down locking member 14 is unlocked.

Thereafter, the pair of pillar holding units 4a and 4b and the affixed-side member 4 are moved downward and it is sufficient to stop the operation of the button 9 at a desired position. At this time, the movable-side member 5, the X linkage mechanism and the like also move downward with the moving of the pair of pillar holding units 4a and 4b.

As described above, the pair of pillar holding units 4a and 4b can be moved in the up and down directions and a step-wise position adjustment according to the plurality of cutouts 15 . . . of the pillar 2a can be realized. That is, the position adjustment of the headrest 1 in the up and down directions can be carried out in a step-wise manner.

According to the embodiment, the front-back positional adjustment of the movable-side member 5 using the to-be-engaged units 10 and supporting of the heat by the to-be-engaged units 10 at the time collision are compatible. Therefore, the level of comfort and security of the seat when a passenger sits thereon can be improved.

Since the plurality of to-be-engaged units 10 and 10 are arranged at a plurality of parts having the moving mechanism therebetween, operation of the moving mechanism and the front-back locking mechanism can be carried out in a good balance. Further, since the head can be supported by the plurality of to-be-engaged units 10 and 10, the level of security can be improved.

Since the connecting members S are used to connect the to-be-engages units 10, the link 6 (7) and the supporting units 35 (36) and used as rotary shafts, the number of parts needed can be reduced due to sharing the parts.

Even if the parts to be connected increase, they can be connected by the connecting members S. Therefore, the effect of reduction in the number of parts due to sharing can be improved even more.

Therefore, such configuration can preferably respond to the request to reduce the number of parts by sharing the parts.

Moreover, the length in the up and down directions of the part near the upper end of the elongated hole 64a of one of the attachment units 64 can be made longer for the part corresponding to the very front teeth 60a. Therefore, rigidity of one of the attachment units 64 can be improved.

Therefore, such configuration can preferably respond to the request to improve the rigidity of one of the attachment units 64 and the to-be-engaged units 10.

By forming at least one of the plurality of reinforcement units 53 . . . of the link member 7 (6) in the honeycomb structure, the link member 7 (6) can be lightened and reinforced so as not to bend easily.

Therefore, such configuration can preferably respond to the request to make the link member 7 (6) lighter and to reinforce the link member 7 (6) so as not to bend easily.

Interference between the reinforcement rib 37 of the front cover 30 and the front end part of the link member 6 (7) can be prevented, and rigidity of the front cover 30 can be improved by the reinforcement rib 37.

Therefore, such configuration can preferably respond to the request to prevent interference between the reinforcement rib 37 and the front end part of the link member 6 (7) and to improve rigidity of the front cover 30.

The upper end parts of the pair of pillar holding units 4a and 4b can be connected by the connector 4d. Therefore, the connecting condition of the pillar holding units 4a and 4b forming the pair can be improved and rigidity of the affixed-side member 4 can be improved.

Therefore, such configuration can preferably respond to the request to improve the connecting condition of the pillar holding units 4a and 4b forming the pair and to improve the rigidity of the affixed-side member 4. In the technique of Patent Document 1, the back-side fixated rotary shaft which is the rotary shaft of the arms constituting the link member is also used as the member connecting the upper end parts of the left and right side surfaces. Therefore, there has been a desire to improve the rigidity. In view of this, the affixed-side member 4 of the embodiment is preferable since the rigidity is improved by the connector 4d.

Since the moving mechanism can be housed in the concave unit 22, the limited space between the affixed-side member 4 and the movable-side member 5 can be used efficiently, and the headrest 1 can be formed in a compact manner.

Therefore, such configuration can preferably respond to the request to form the headrest 1 in a compact manner.

The projecting tips of the to-be-engaged units 10 which are inserted in the through holes 23a and 23b are held by the affixed-side member 4 in which the through holes 23a and 23b are formed. Further, since the to-be-engaged units 10 can be supported by the walls 24a and 24b which face the to-be-engaged units 10, stability of the movable-side member 5 at the time of front-back positional adjustment can be improved.

Therefore, such configuration can preferably respond to the request to improve the stability of the movable-side member 5 at the time of front-back positional adjustment.

INDUSTRIAL APPLICABILITY

The headrest of the embodiment can be applied to a headrest which receives the head of a passenger who sits on a seat.

REFERENCE SIGN LIST 1 headrest
2a pillar
2b pillar
4 affixed-side member
4a pillar holding unit
4b pillar holding unit
4c back side connector
4d connector
5 movable-side member
6 first link member
7 second link member
8 cross connection unit
9 operation unit
10 to-be-engaged unit
11 locking member
12 biasing unit
13 rotary operation member
14 up-down locking member
15 cutout
16 pillar inserting hole
23a through hole
23b through hole
24a wall
24b wall
25 supporting unit
25a through hole
26 supporting unit
26a through hole
27 reinforcement unit
28 lock holding unit
28a opening
28b catch unit
30 front cover
30b surrounding unit
31 back cover
31b surrounding unit
33 holding unit
35 supporting unit
35a through hole
35b protruding unit
36 supporting unit
36a through hole
36b protruding unit
40 first arm
41 second arm
42 connection
50 side wall unit
51 inside unit
52 connection
53 reinforcement unit
60 first protruding unit
60a plurality of teeth
61 second protruding unit
62 space
63 attachment unit
63a through hole
64 attachment unit
64a through hole
70 to-be-held unit
71 engaging unit
72 connecting unit
73 cover member
74 protruding abutting unit
75 escape unit
80 first operation unit
81 second operation unit
82 rotary shaft unit
83 concave unit
90 button main body
90b protruding unit

The invention claimed is:

1. A headrest, comprising:
an affixed-side member which is arranged at a headrest pillar;
a moveable-side member which is connected to the affixed-side member via a moving mechanism and which moves in front and back directions with respect to the affixed-side member; and
a front-back looking mechanism including a to-be-engaged unit and a lock member which engages with the to-be-engaged unit, the front-back looking mechanism locking and unlocking movement of the moveable-side member in the front and back directions, wherein
the moveable-side member includes a front cover which supports a head,
the to-be-engaged unit is attached on a back surface of the front cover,
a plurality of the to-be-engaged units are independently provided on right and left sides, and
each of the plurality of the to-be-engaged units is provided with teeth arranged along a front to rear direction.

2. A headrest, comprising:
an affixed-side member which is arranged at a headrest pillar;
a movable-side member which is connected to the affixed-side member via a moving mechanism and which moves in front and back directions with respect to the affixed-side member; and
a front-back locking mechanism including a to-be-engaged unit and a lock member which engages with the to-be-engaged unit, the front-back locking mechanism locking and unlocking movement of the movable-side member in the front and back directions, wherein
the movable-side member includes a front cover which supports a head,
the to-be-engaged unit is attached on a back surface of the front cover,
a plurality of the to-be-engaged units are provided, and
the plurality of the to-be-engaged units are arranged at position so that the moving mechanism is to be arranged therebetween.

3. A headrest, comprising:
an affixed-side member which is arranged at a headrest pillar;
a movable-side member which is connected to the affixed-side member via a moving mechanism and which moves in front and back directions with respect to the affixed-side member; and a front-back locking mechanism including a to-be-engaged unit and a lock member which engages with the to-be-engaged unit, the front-back locking mechanism locking and unlocking movement of the movable-side member in the front and back directions, wherein the movable-side member includes a front cover which supports a head, the to-be-engaged unit is attached on a back surface of the front cover, the moving mechanism is formed in a linkage mechanism, the front cover includes supporting units which rotatably support link members which constitute the linkage mechanism, and connecting members, which rotatably connect end parts of the link members to the supporting units, are provided so as to penetrate the to-be-engaged unit, the link members and the supporting units.

4. The headrest according to claim 3, wherein the linkage mechanism is a X linkage mechanism including a first link member and a second link member which are rotably connected via a center cross connection unit, and the supporting units of the front cover are arranged on both sides of the front cover in up and down directions, a front end of the first link member and a front end of the second link member are rotatably supported by the upper and lower supporting units, and the connecting members are provided so as to respectively penetrate the supporting units.

5. The headrest according to claim 4, wherein through holes in which the connecting members go through are respectively formed at the upper and lower supporting units, one of the through holes of the upper and lower supporting units is an elongated hole which is elongated in the up and down directions, the to-be-engaged unit includes:
  a plurality of teeth which are arranged in front and back directions; and
  upper and lower attaching units which are attached to the front cover, through holes in which the connecting members go through being formed in the upper and lower attaching units, one of the through holes of the upper and lower attachment units is an elongated hole which is elongated in the up and down directions, and the one of the through holes of the attaching units and a tooth at very front among the plurality of teeth align in a vertical direction.

6. The headrest according to claim 3, wherein the link members include a plurality of reinforcement units arranged at a plurality of parts of the link members, and at least one of the plurality of reinforcement units is formed in a honeycomb structure.

7. The headrest according to claim 3, wherein the front cover includes a reinforcement rib which is arranged on a back surface of the front cover, and the reinforcement rib and the front end parts of the link members are arranged on left and right sides of each other.

8. A headrest, comprising:

an affixed-side member which is arranged at a headrest pillar;

a movable-side member which is connected to the affixed-side member via a moving mechanism and which moves in front and back directions with respect to the affixed-side member; and a front-back locking mechanism including a to-be-engaged unit and a lock member which engages with the to-be-engaged unit, the front-back locking mechanism locking and unlocking movement of the movable-side member in the front and back directions, wherein the movable-side member includes a front cover which supports a head, the to-be-engaged unit is attached on a back surface of the front cover, the to-be-engaged unit is projected toward the affixed-side member from the back surface of the front cover, a through hole is formed in the affixed-side member at a position corresponding to the to-be-engaged unit, the to-be-engaged unit being inserted in the through hole, and a wall which faces the to-be-engaged unit is provided at a circumference of the through hole.

9. A headrest, comprising:

an affixed-side member which is arranged at a headrest pillar;

a movable-side member which is connected to the affixed-side member via a moving mechanism and which moves in front and back directions with respect to the affixed-side member; and a front-back locking mechanism including a to-be-engaged unit and a lock member which engages with the to-be-engaged unit, the front-back locking mechanism locking and unlocking movement of the movable-side member in the front and back directions, wherein the movable-side member includes a front cover which supports a head, the to-be-engaged unit is attached on a back surface of the front cover, the headrest pillar includes a pair of pillars, the affixed-side member includes:
  a pair of pillar holding units which are arranged on both side end parts of the affixed-side member and which respectively hold the pillars of the headrest pillar forming the pair; and
  a connector which connects between the upper ends of the pillar holding units forming the pair, a part of the affixed-side member which is surrounded by the pillar holding units forming the pair and the connector is a concave unit, and when the affixed-side member and the movable-side member are close to each other, the moving mechanism is to be housed in the concave unit.

\* \* \* \* \*